US011460077B2

(12) United States Patent
Ozawa et al.

(10) Patent No.: US 11,460,077 B2
(45) Date of Patent: Oct. 4, 2022

(54) POWER TRANSMISSION DEVICE

(71) Applicant: Kabushiki Kaisha F.C.C., Hamamatsu (JP)

(72) Inventors: Yoshihiko Ozawa, Hamamatsu (JP); Han Hiong Chen, Hamamatsu (JP); Makoto Kataoka, Hamamatsu (JP); Masataka Murai, Hamamatsu (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 0 days.

(21) Appl. No.: 17/336,447

(22) Filed: Jun. 2, 2021

(65) Prior Publication Data
US 2021/0356000 A1    Nov. 18, 2021

Related U.S. Application Data

(63) Continuation of application No. PCT/JP2019/047408, filed on Dec. 4, 2019.

(30) Foreign Application Priority Data

Dec. 5, 2018 (JP) .............................. JP2018-227995

(51) Int. Cl.
*F16D 13/56* (2006.01)
*F16D 43/12* (2006.01)

(52) U.S. Cl.
CPC ............. *F16D 13/56* (2013.01); *F16D 43/12* (2013.01); *F16D 2013/565* (2013.01)

(58) Field of Classification Search
CPC .... F16D 13/52; F16D 13/56; F16D 2013/565; F16D 43/12; F16D 43/206; F16D 67/02;
(Continued)

(56) References Cited

U.S. PATENT DOCUMENTS

2007/0221465 A1* 9/2007 Okada ................... F16D 13/04
192/70.27
2008/0029360 A1* 2/2008 Yamashita ............ F16D 13/583
192/3.61

FOREIGN PATENT DOCUMENTS

JP    2009-30792 A    2/2009
JP    2012-37020 A    2/2012
(Continued)

OTHER PUBLICATIONS

International Search Report dated Feb. 4, 2020 in corresponding PCT Application No. PCT/JP2019/047408.

*Primary Examiner* — Ernesto A Suarez
*Assistant Examiner* — Lori Wu
(74) *Attorney, Agent, or Firm* — Harness, Dickey & Pierce, P.L.C.

(57) ABSTRACT

A power transmission device has an interlocking member 9 moving a pressure member 5 from an inactive position to an active position. A release spring (m) applies an urging force, while allowing movements of the interlocking member 9 and the pressure member 5, until drive-side clutch plates 6 and driven-side clutch plates 7 reach an engaged state before the drive-side clutch plates 6 and the driven-side clutch plates 7 are pressed against each other. A clutch spring 11 is compressed in a process where the interlocking member 9 moves after the drive-side clutch plates 6 and the driven-side clutch plates 7 have reached the engaged state. The clutch spring applying a press-contact force between the drive-side clutch plates 6 and the driven-side clutch plates 7 while allowing movements of the interlocking member 9 and the pressure member 5. The set load of the clutch spring 11 is set to be smaller than the maximum load of the release spring (m).

3 Claims, 29 Drawing Sheets

(58) Field of Classification Search
CPC ... F16D 23/12; F16D 2023/123; B60K 17/02; F16H 61/21
See application file for complete search history.

(56) References Cited

FOREIGN PATENT DOCUMENTS

| | | |
|---|---|---|
| JP | 2017-155883 A | 9/2017 |
| JP | 2017-155884 A | 9/2017 |

* cited by examiner

[Fig. 1]
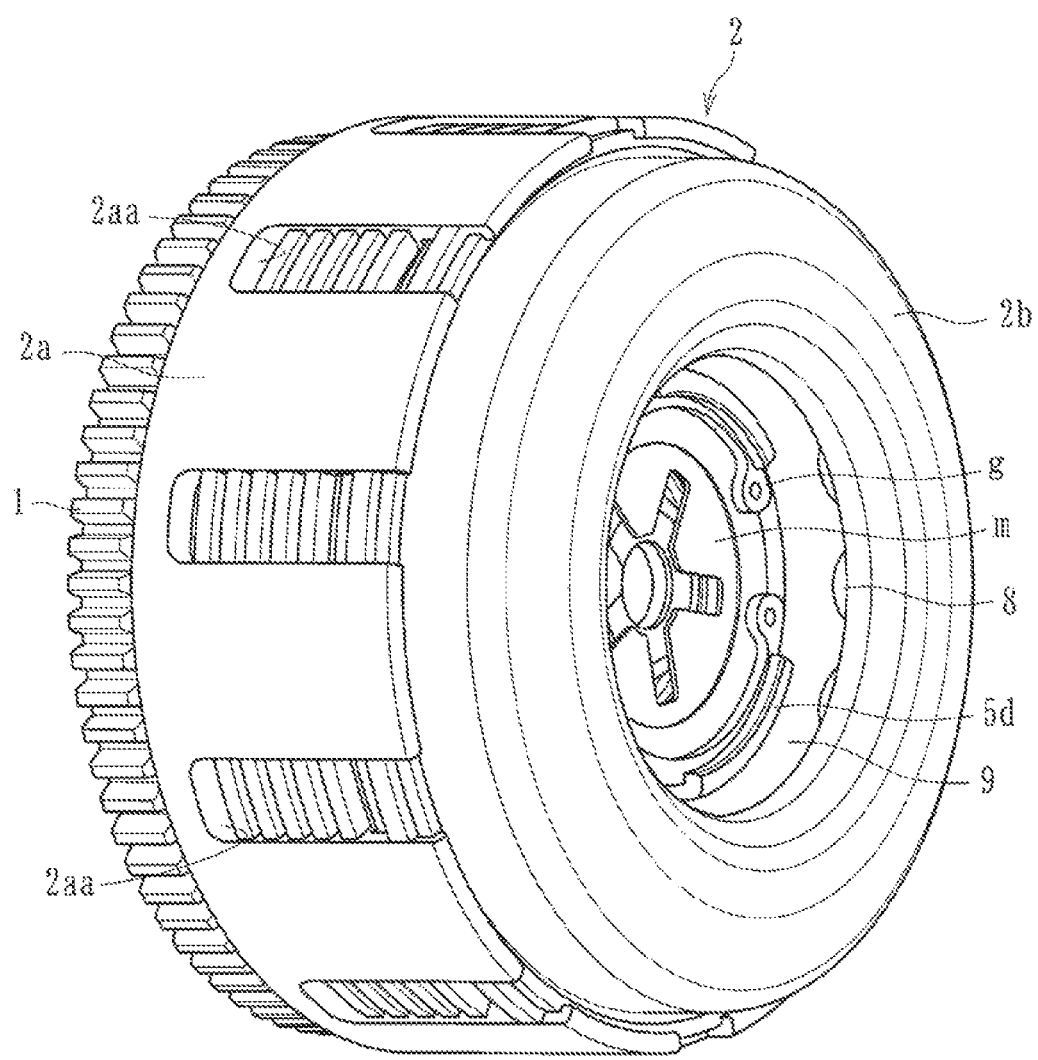

[Fig. 2]
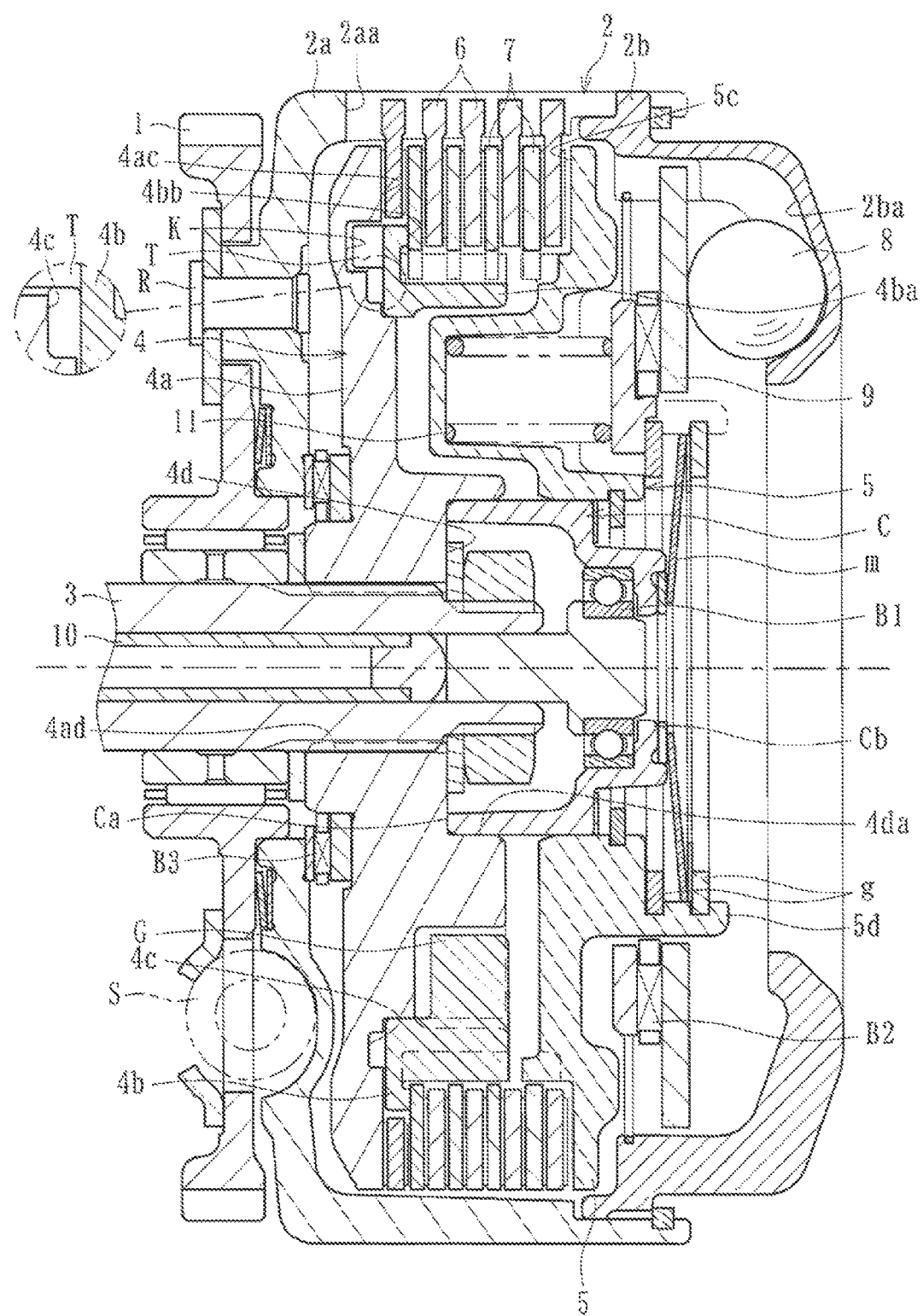

[Fig. 3]
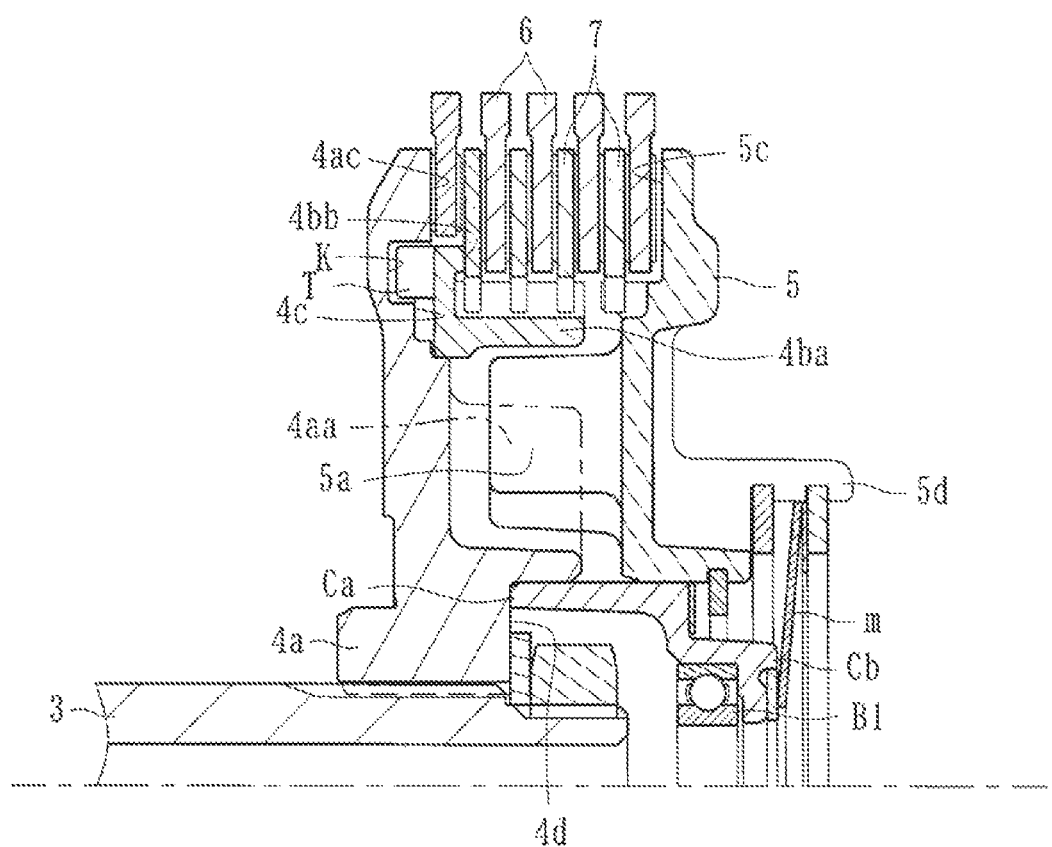

[Fig. 4]
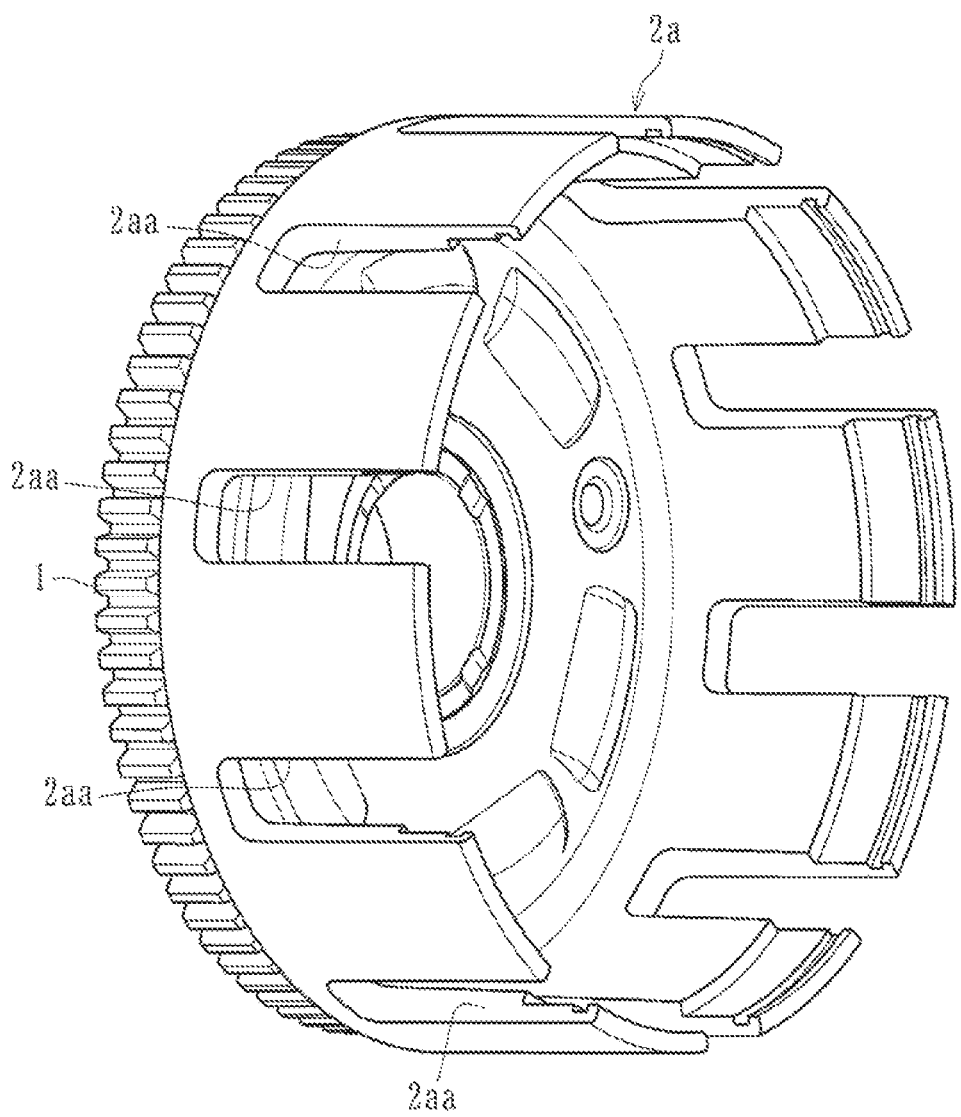

[Fig. 5]
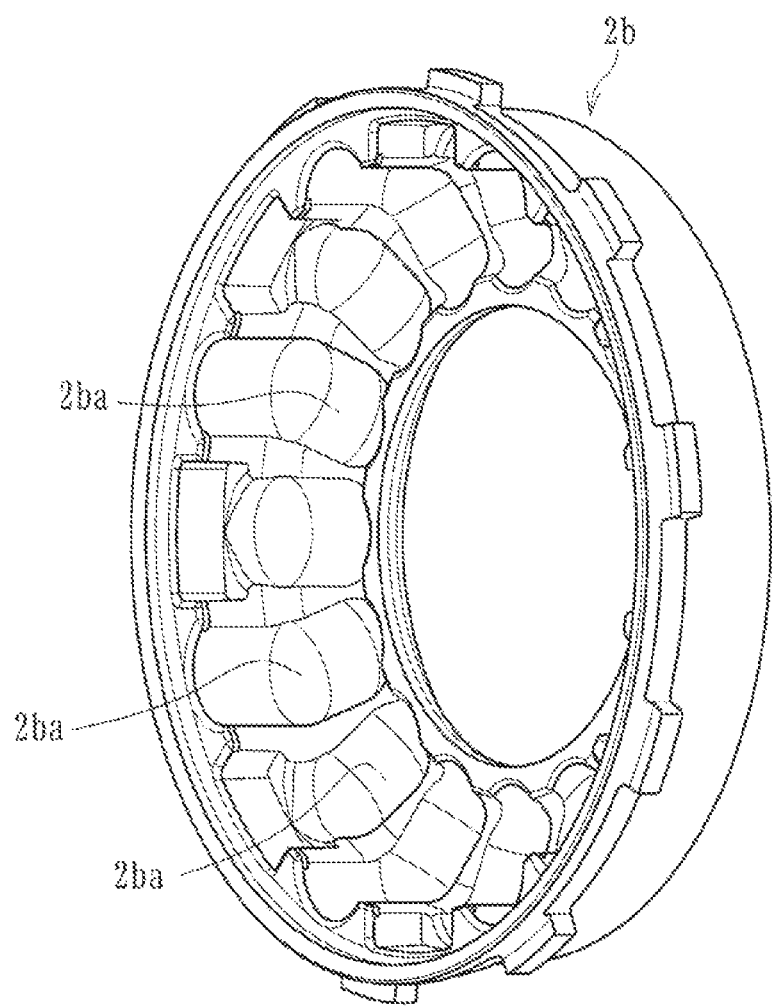

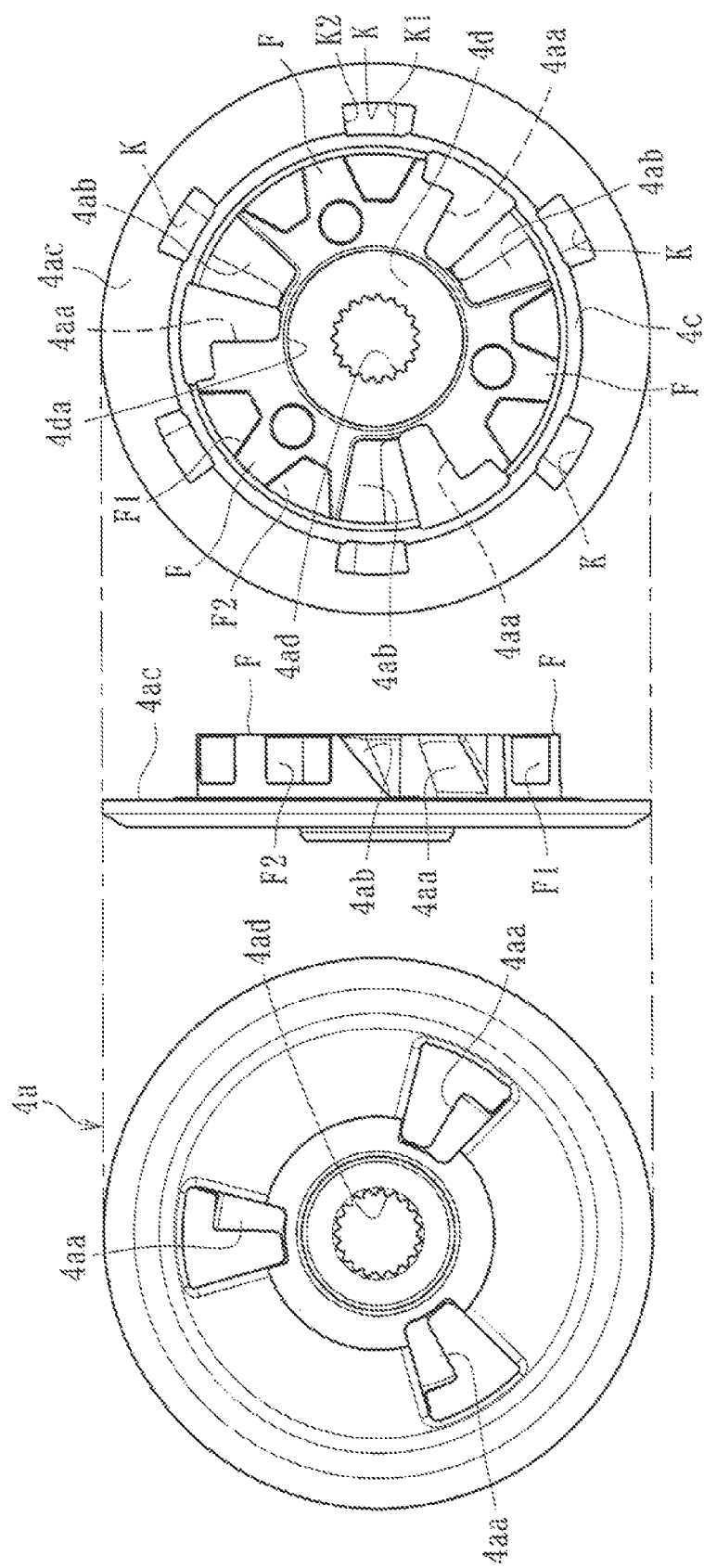

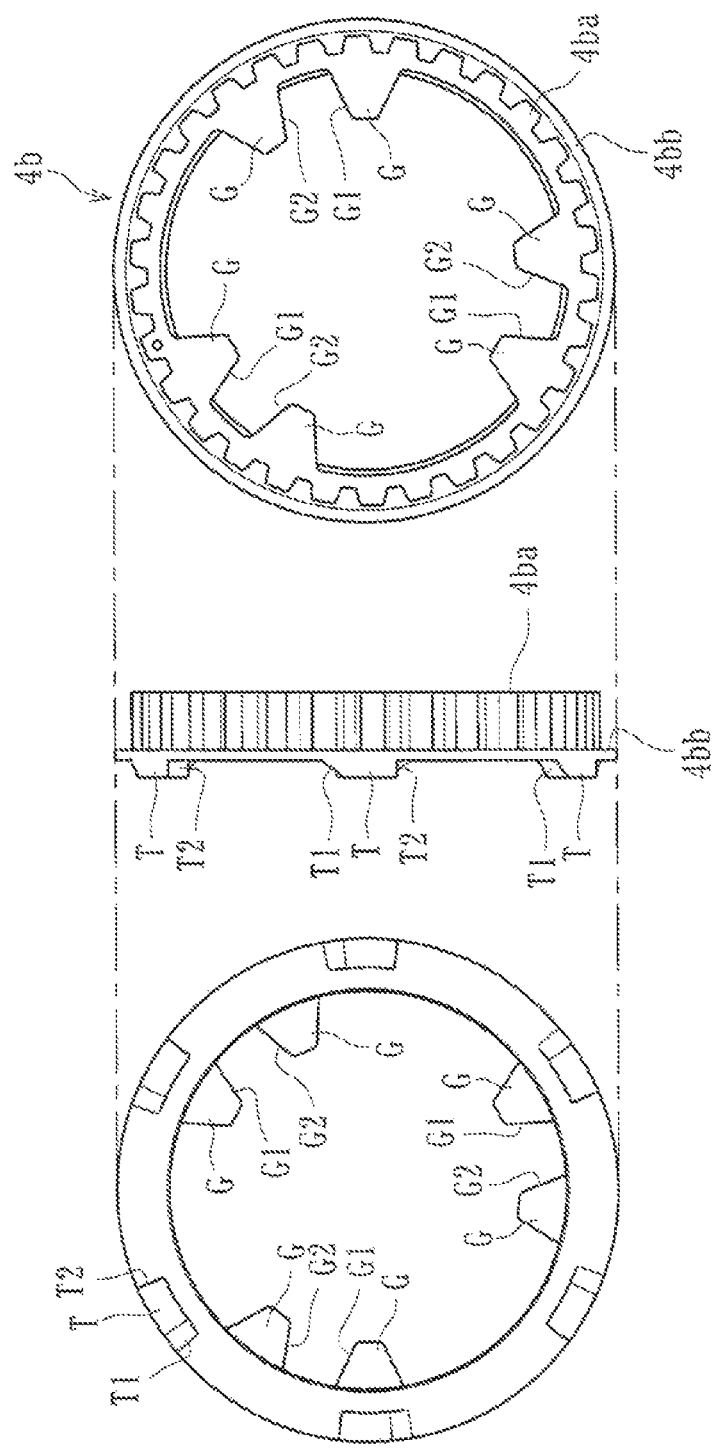
[Fig. 7]

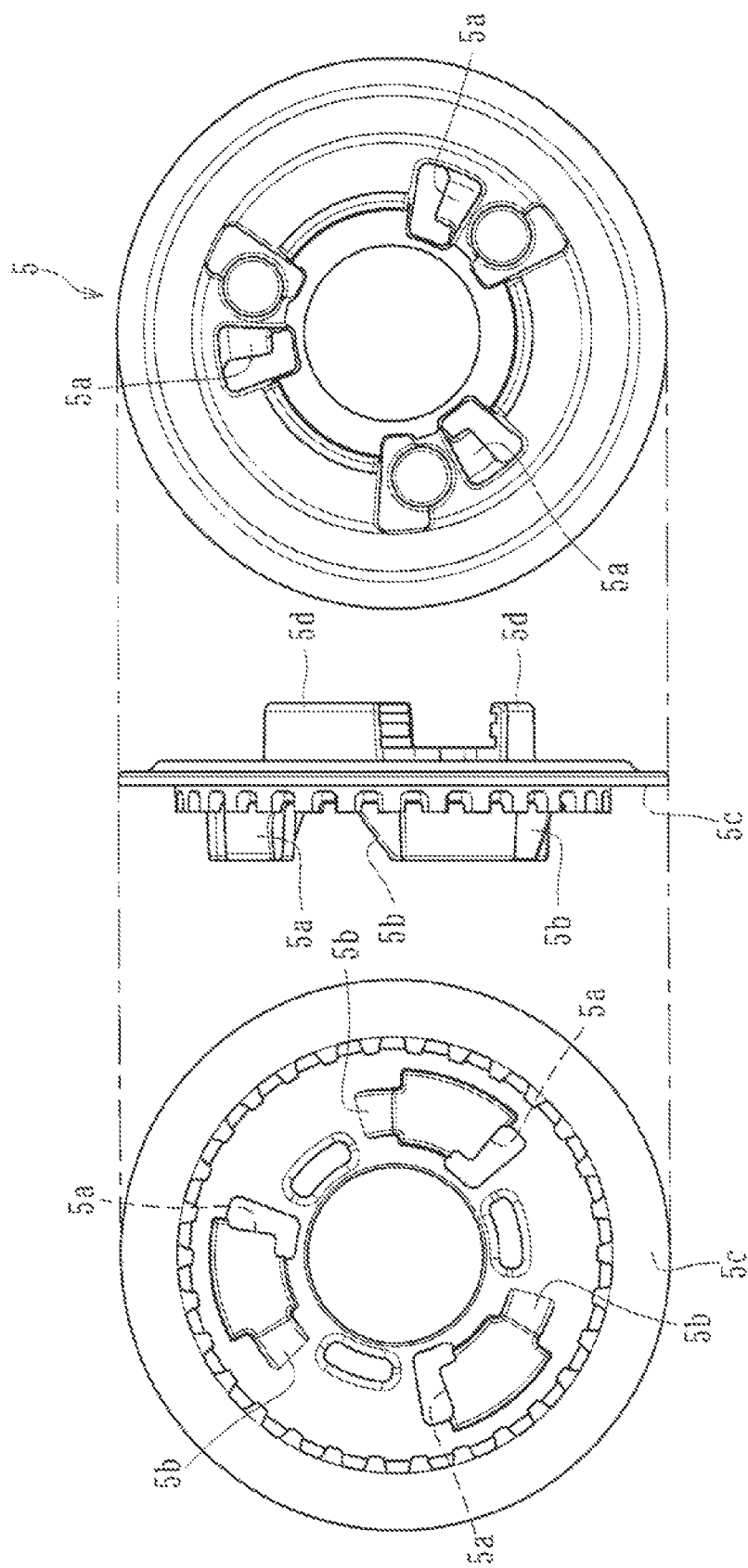
[Fig. 8]

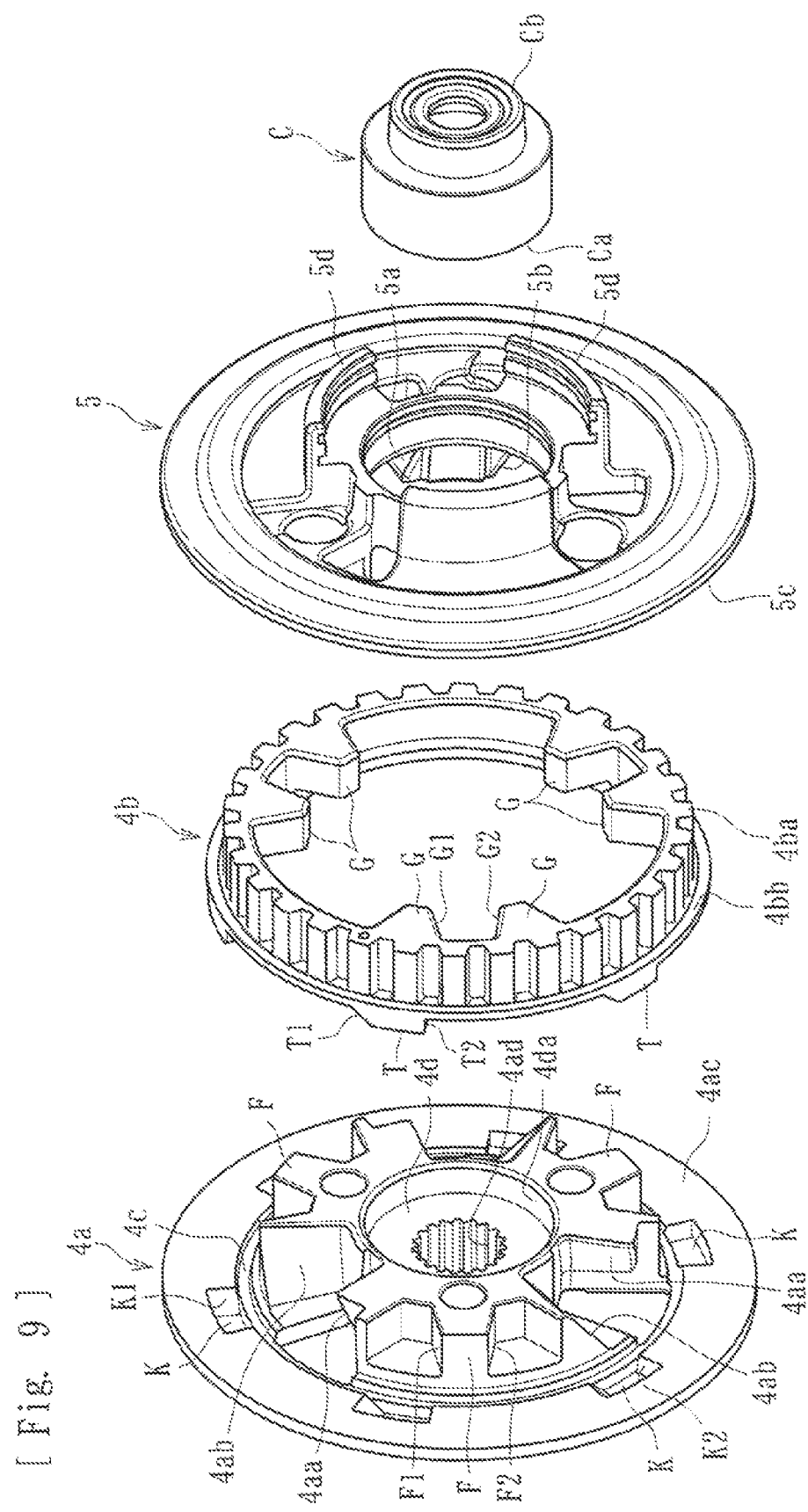

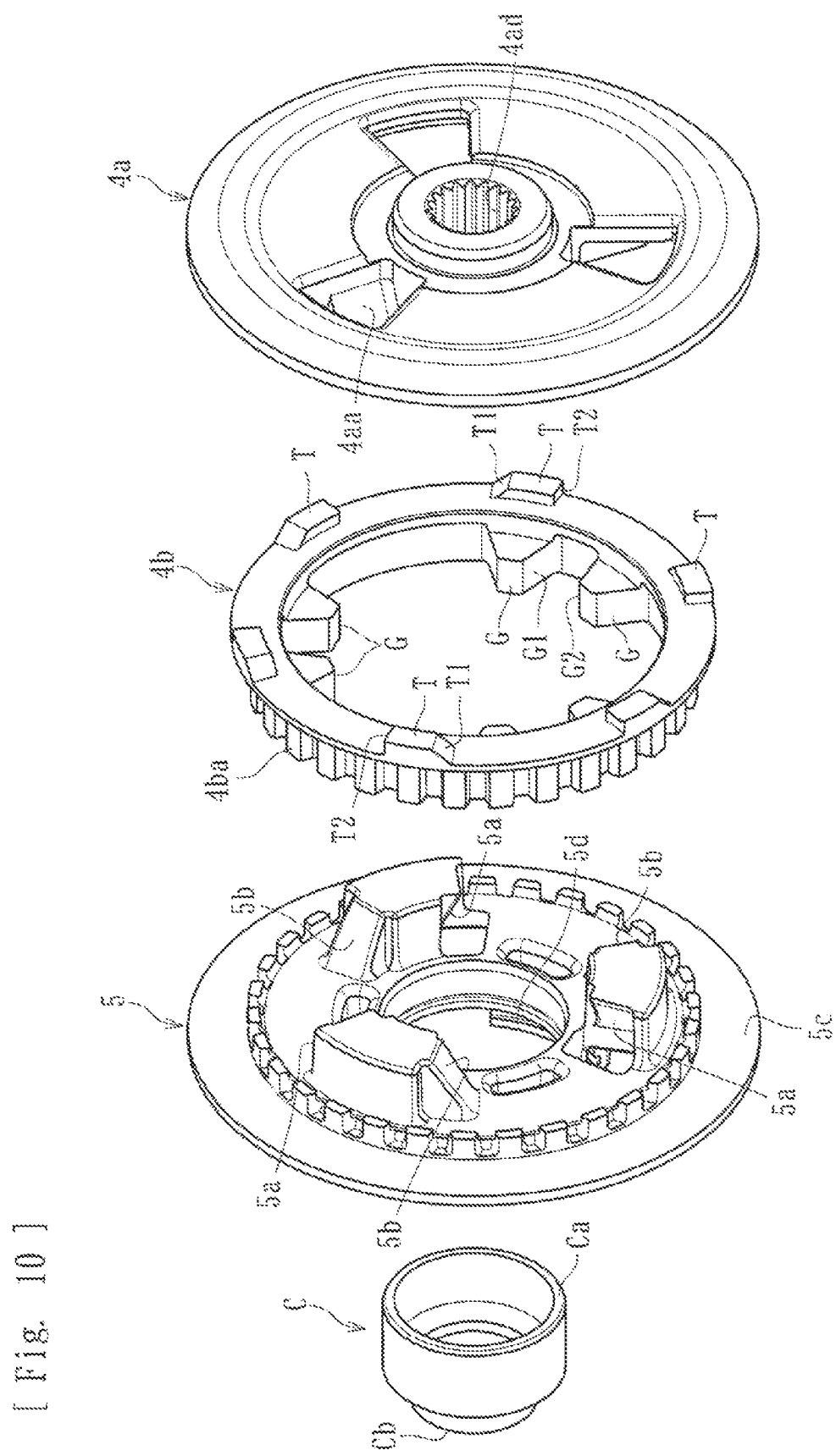
[Fig. 10]

[Fig. 11]
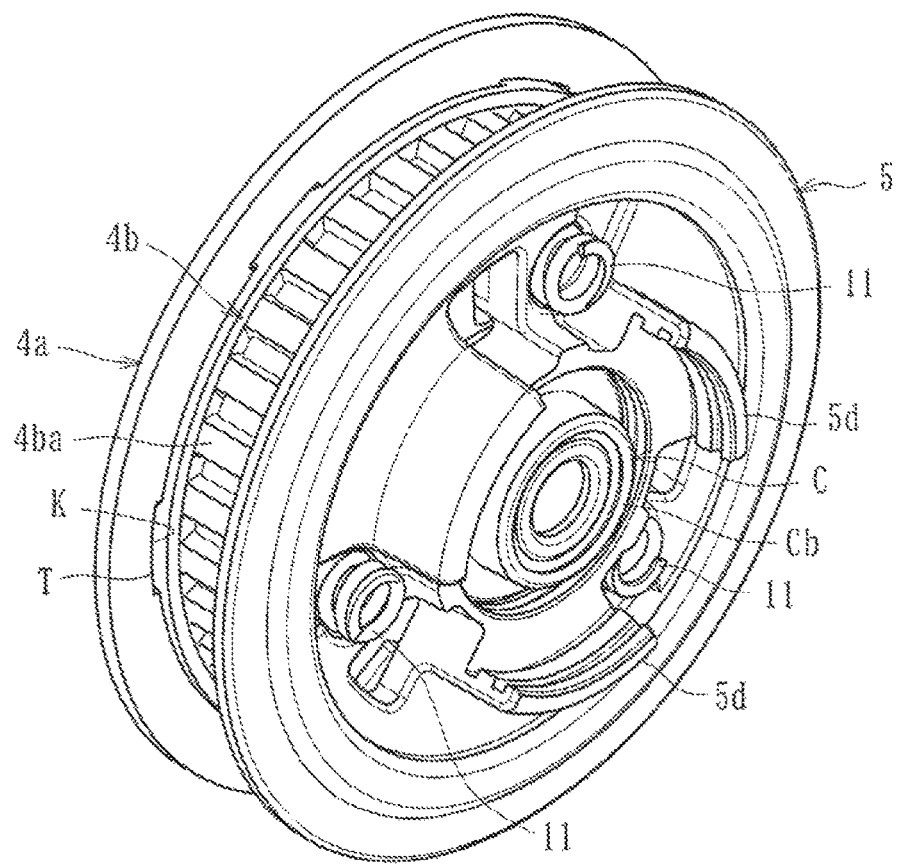
[Fig. 12]
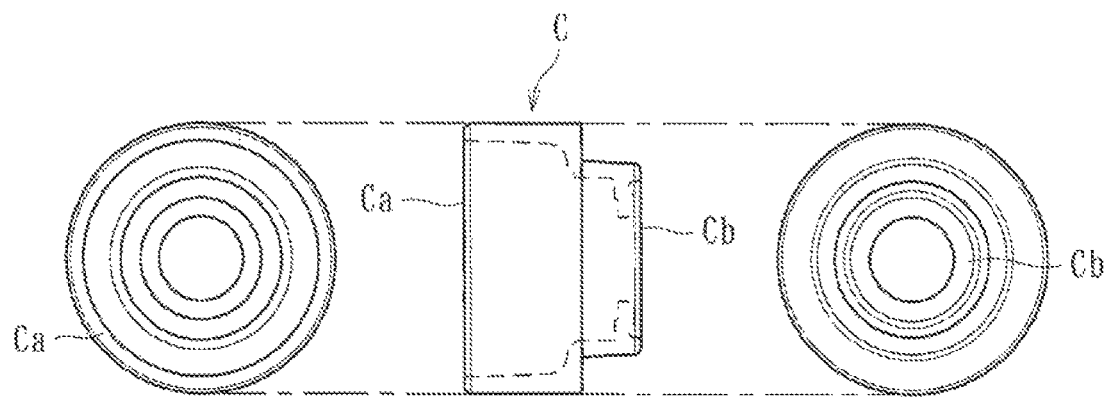

[Fig. 13]
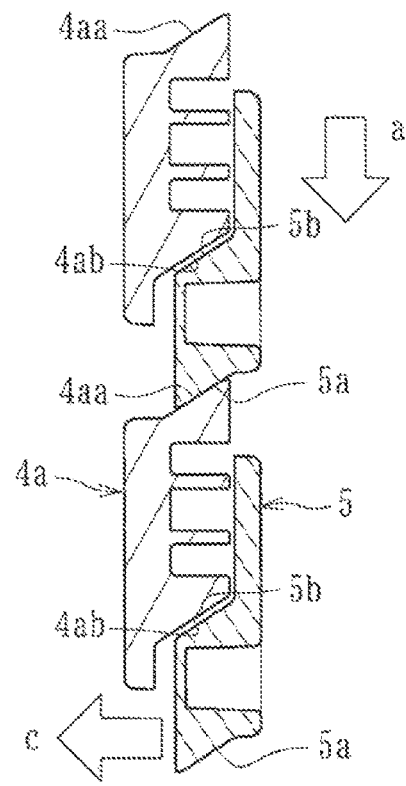
[Fig. 14]
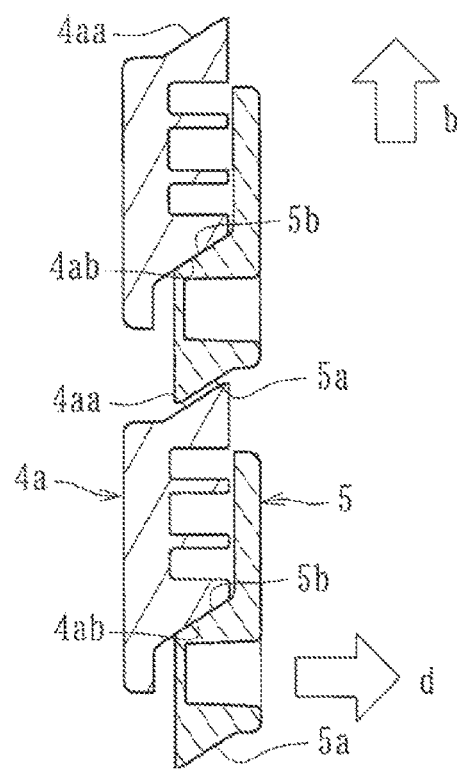

[Fig. 15]
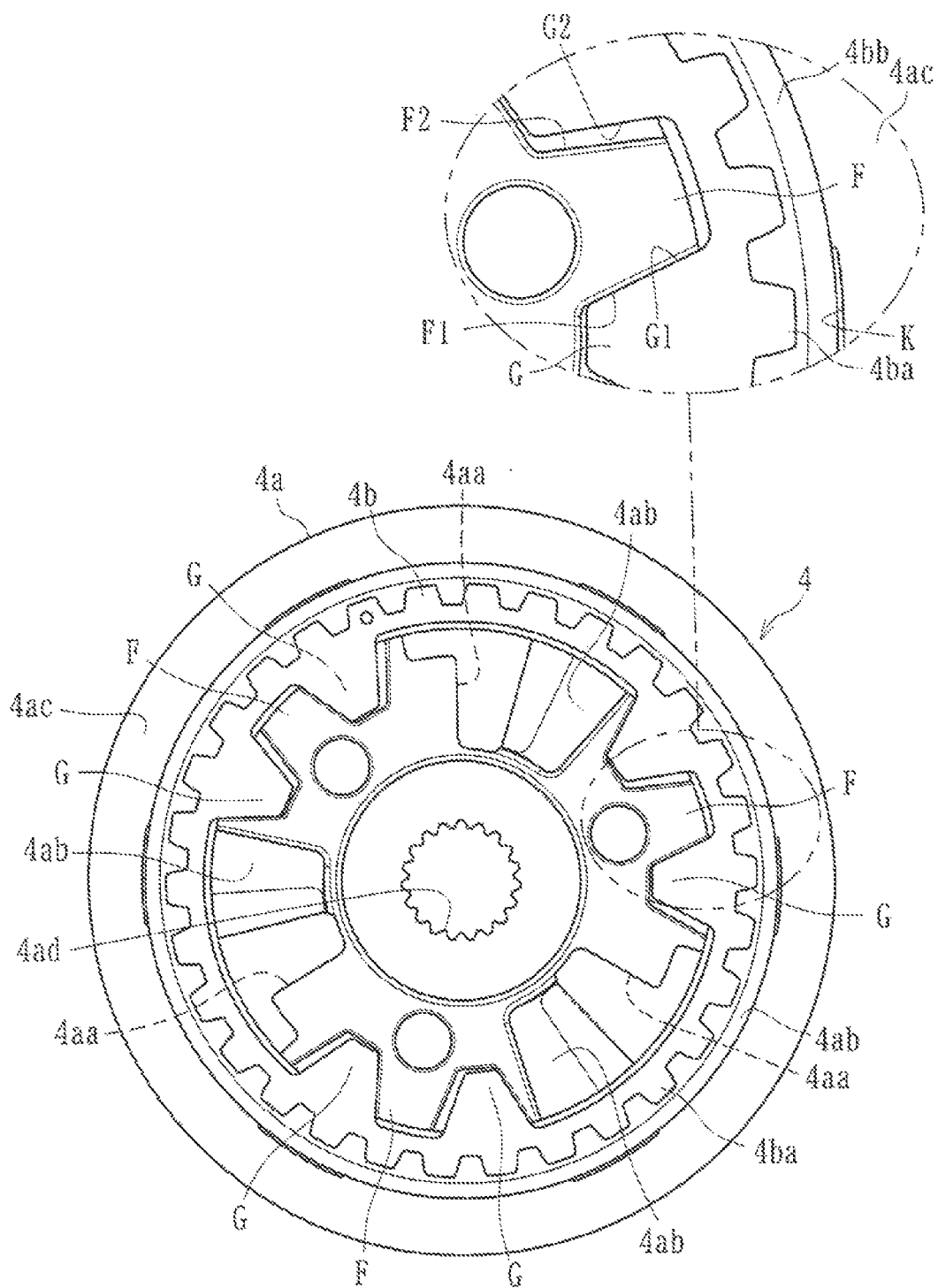

[Fig. 16]
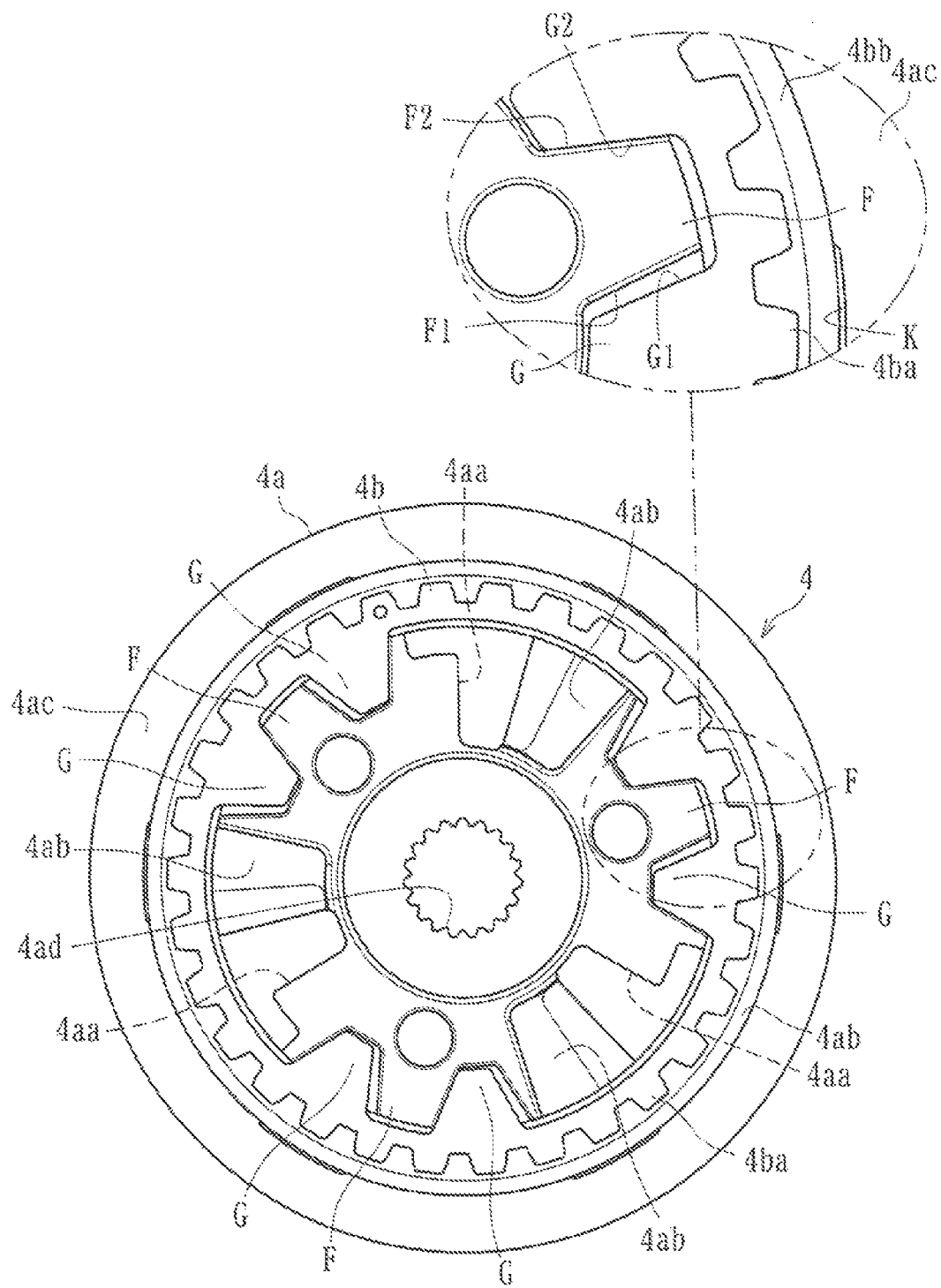

[Fig. 17]
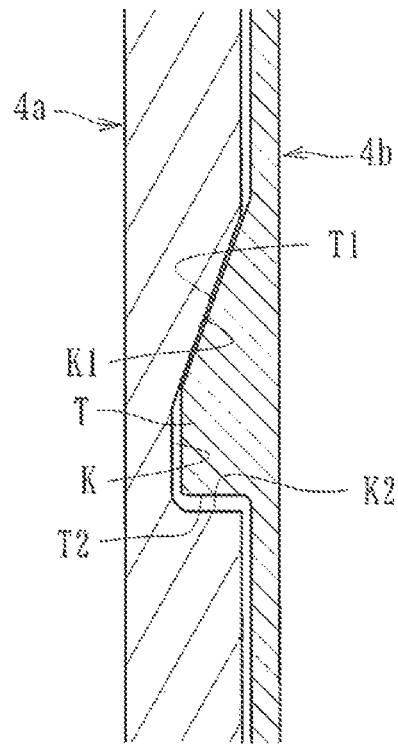
[Fig. 18]
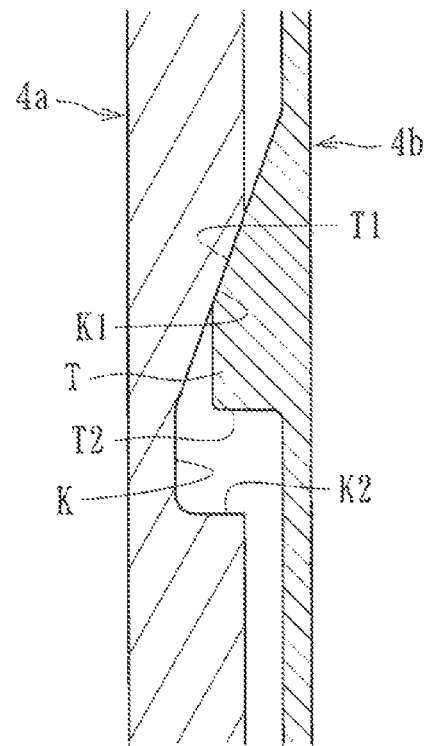

[Fig. 19]
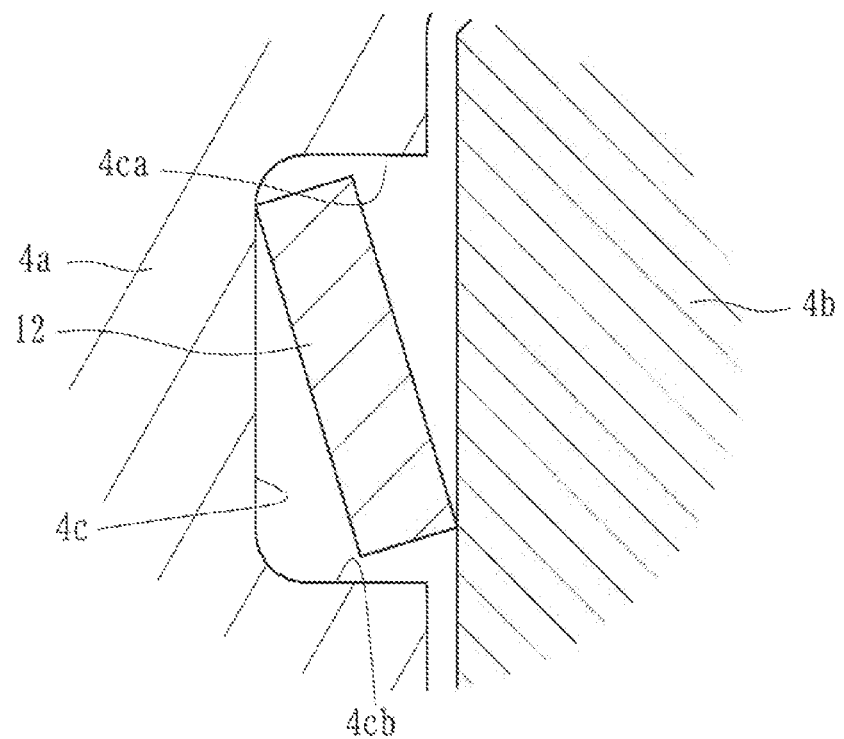

[Fig. 20]
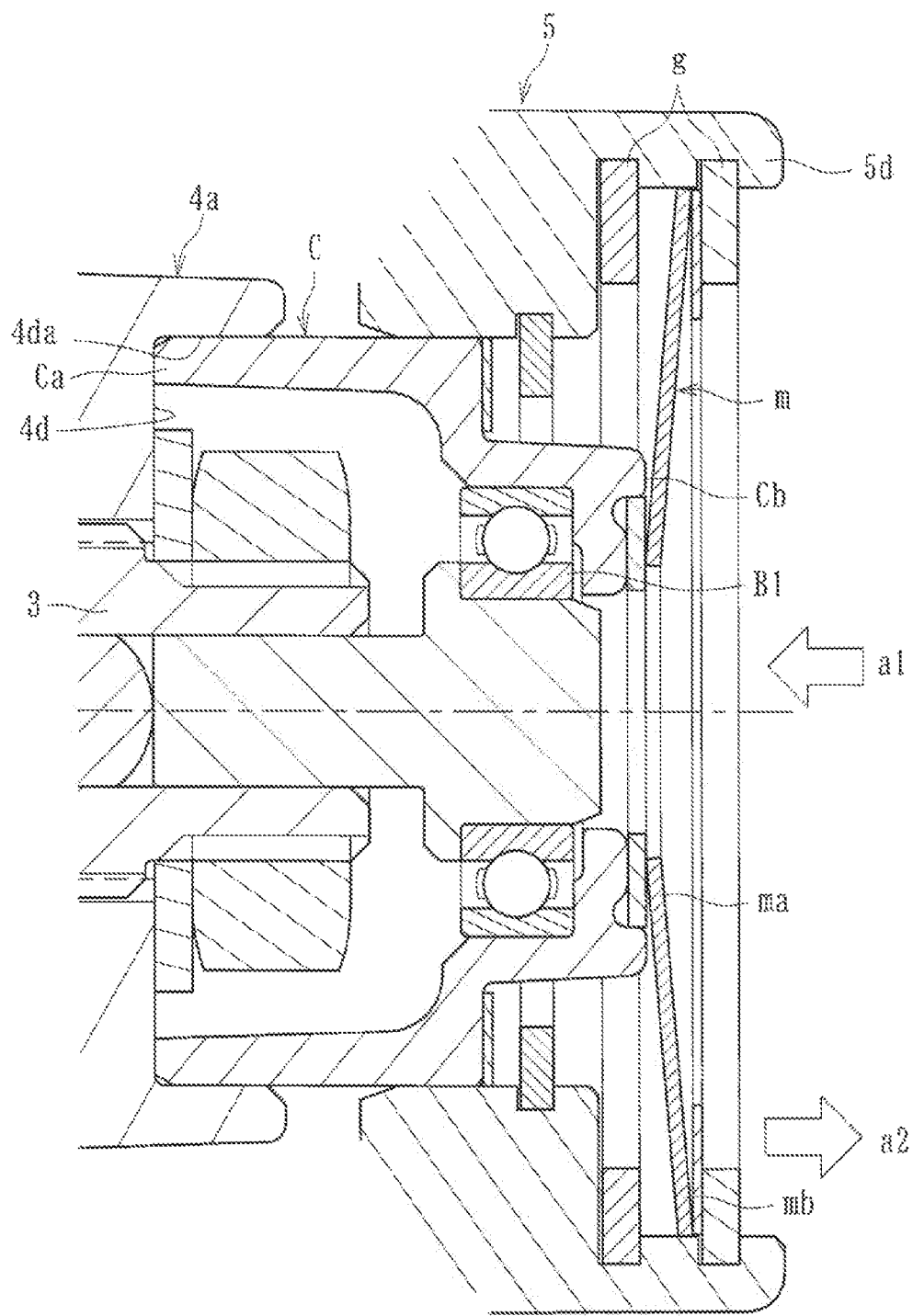

[Fig. 21]
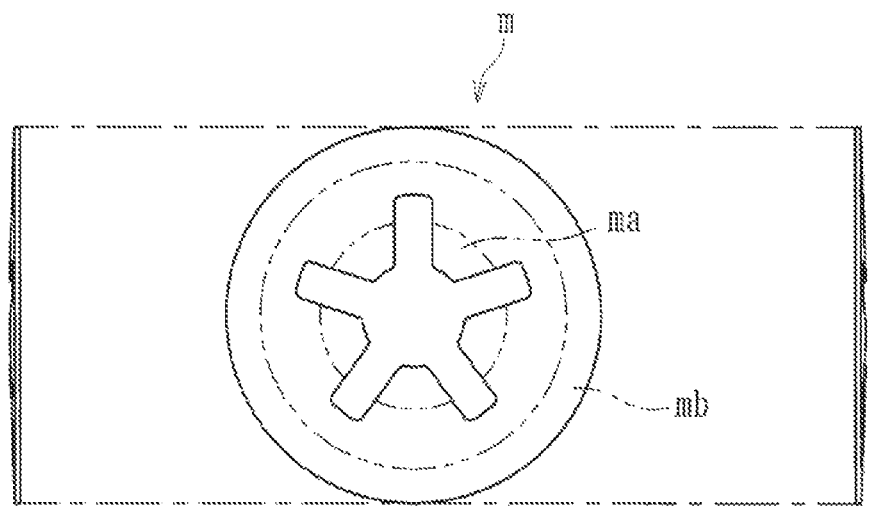

[Fig. 22]
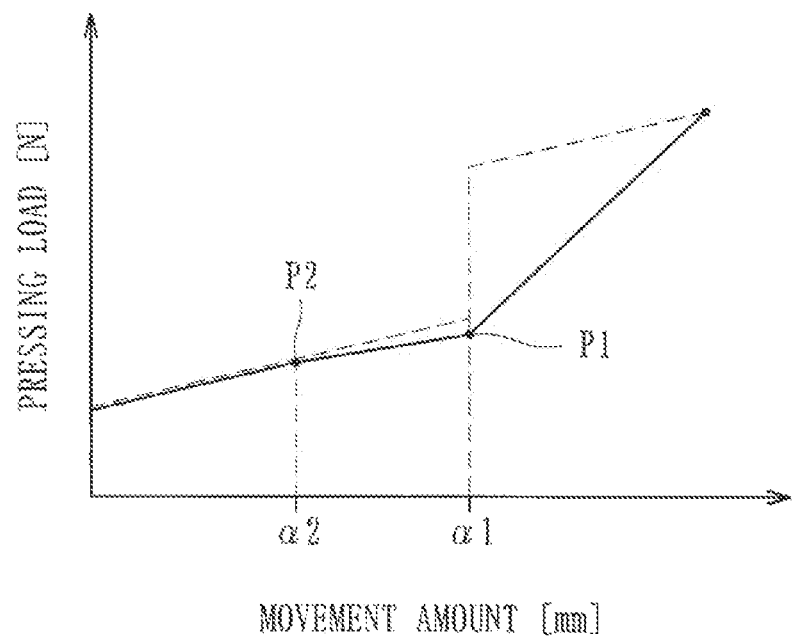
[Fig. 23]
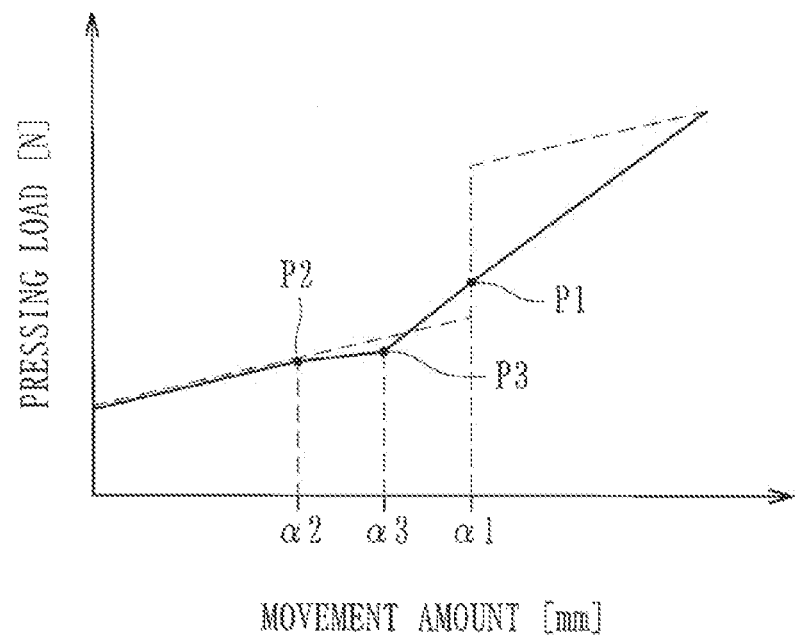

[Fig. 24]
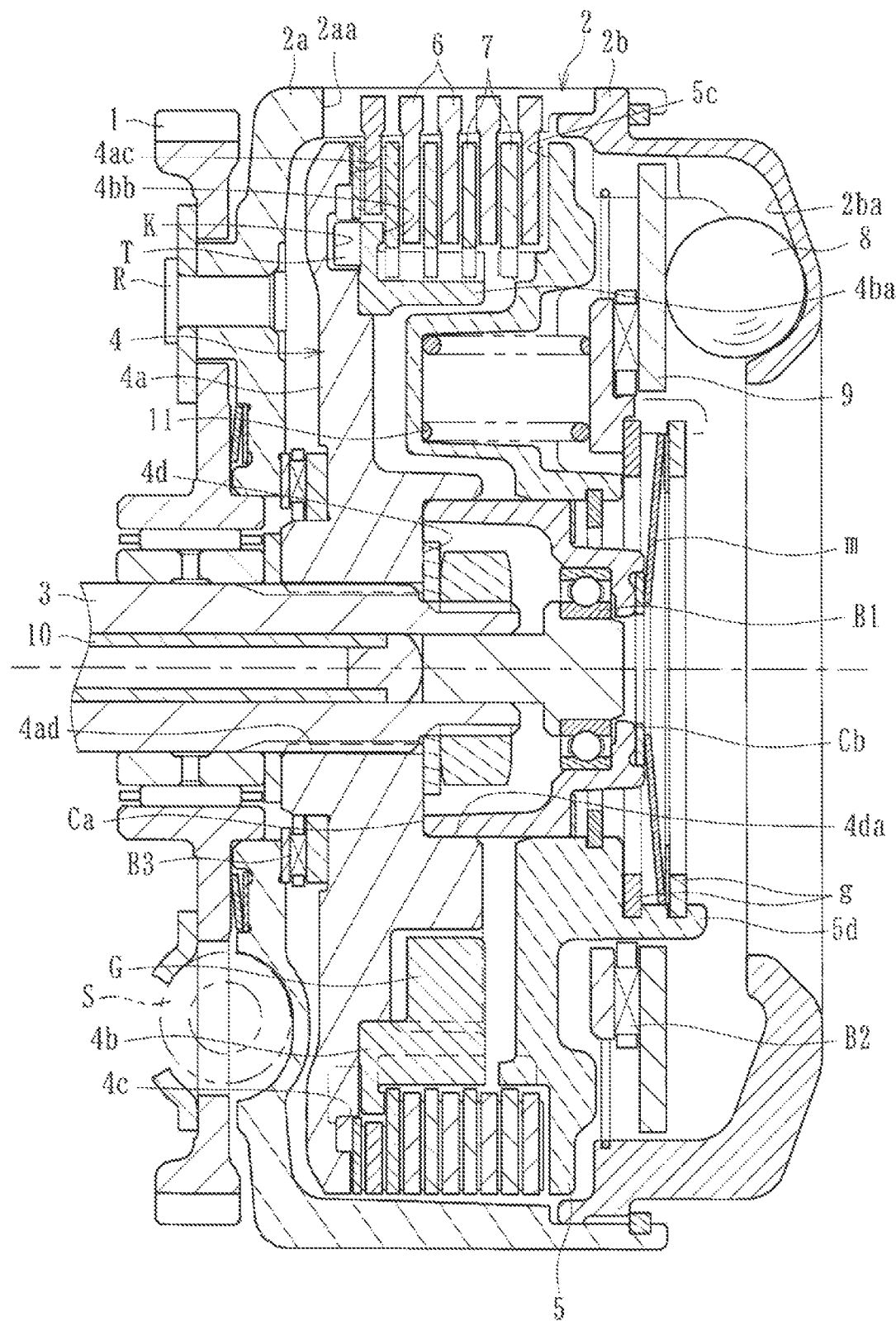

[Fig. 25]
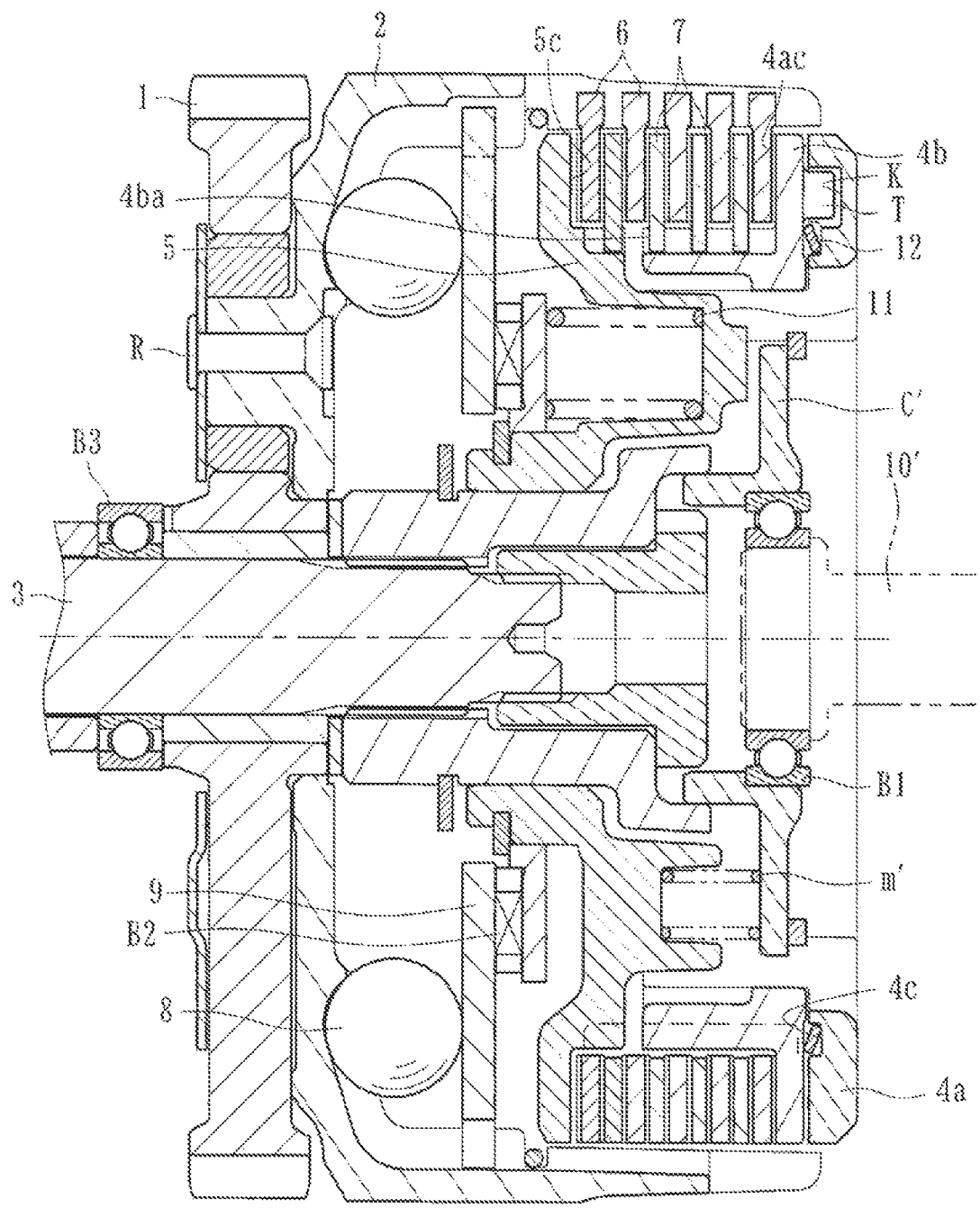

[Fig. 26]
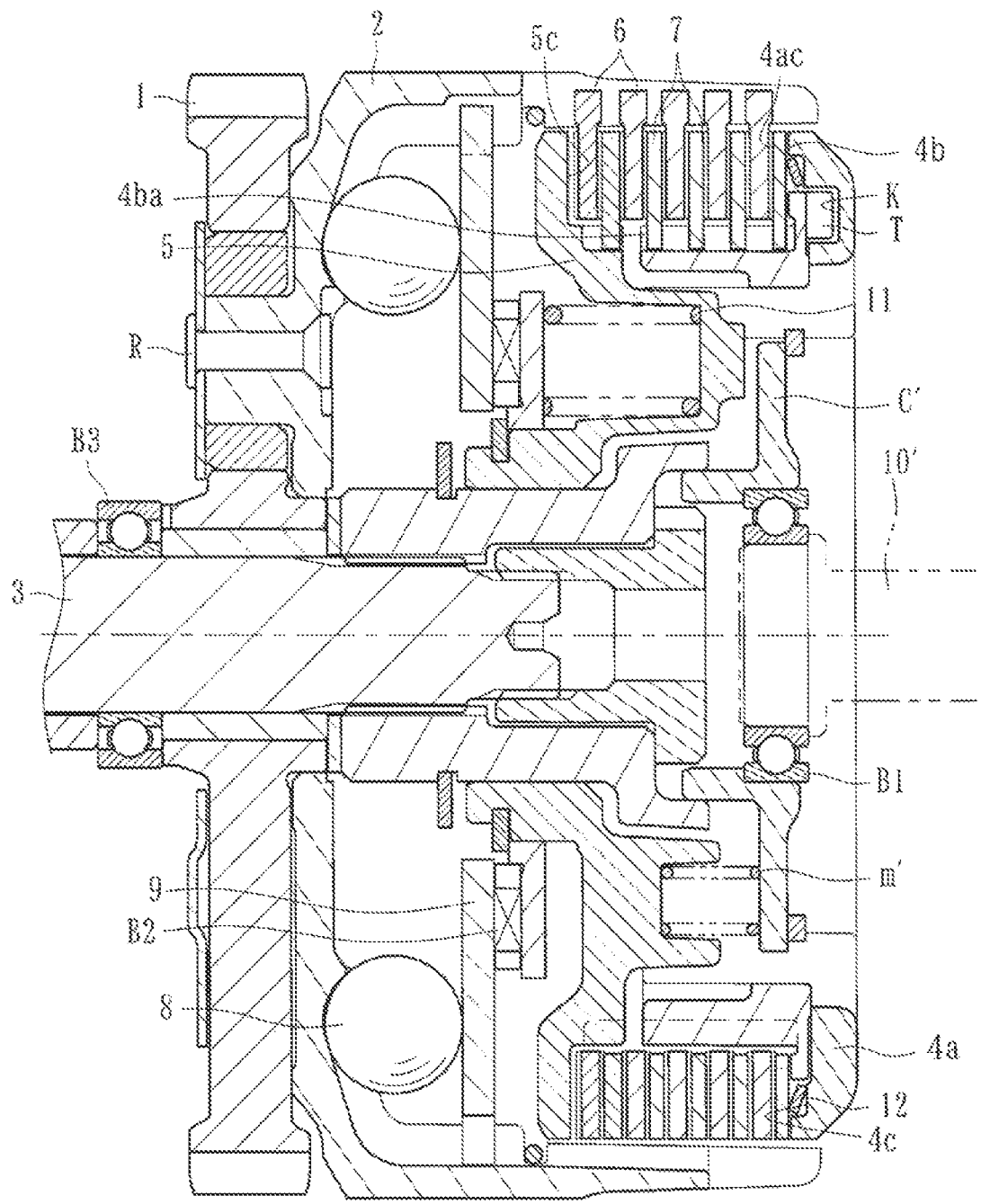

[Fig. 27]
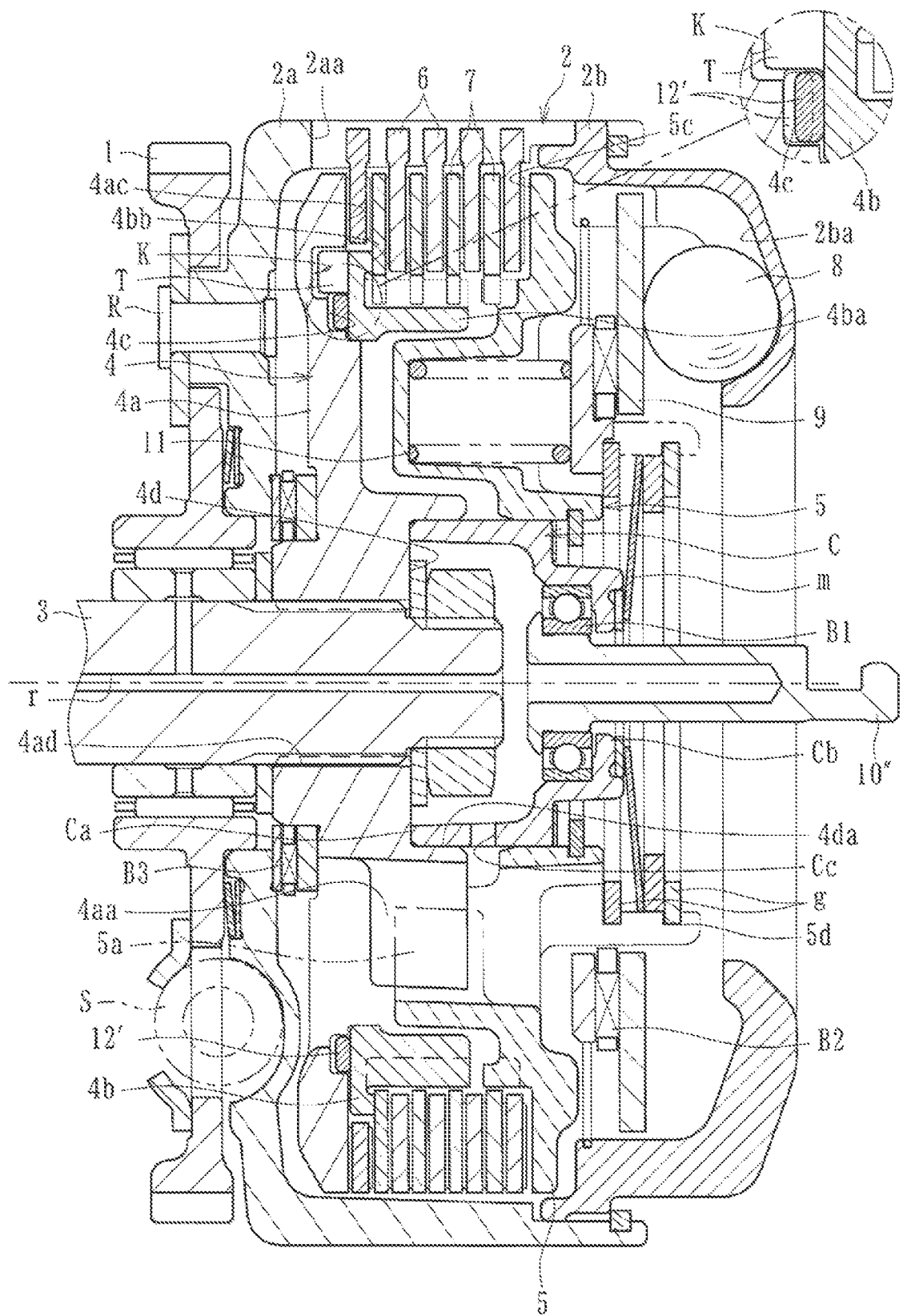

[Fig. 28]
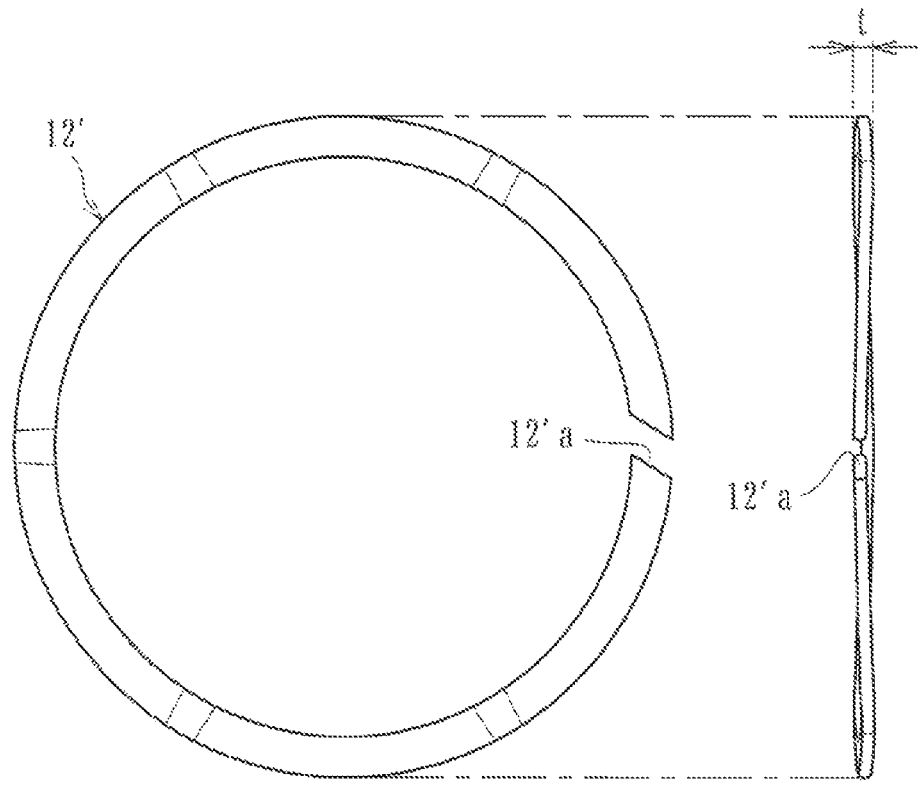
[Fig. 29]
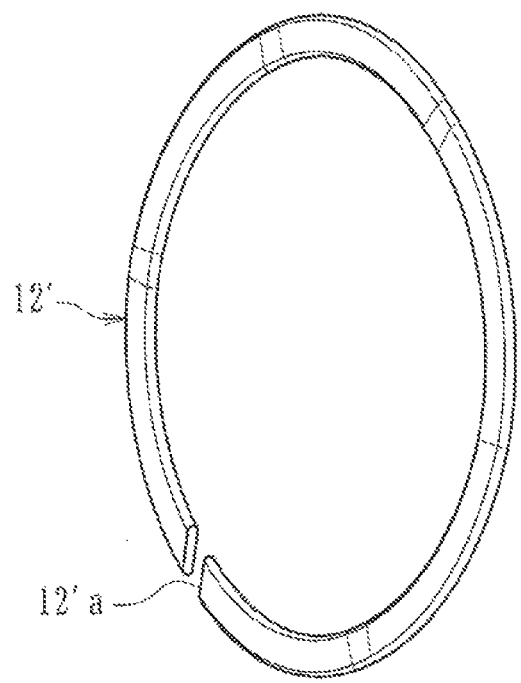

[Fig. 30]
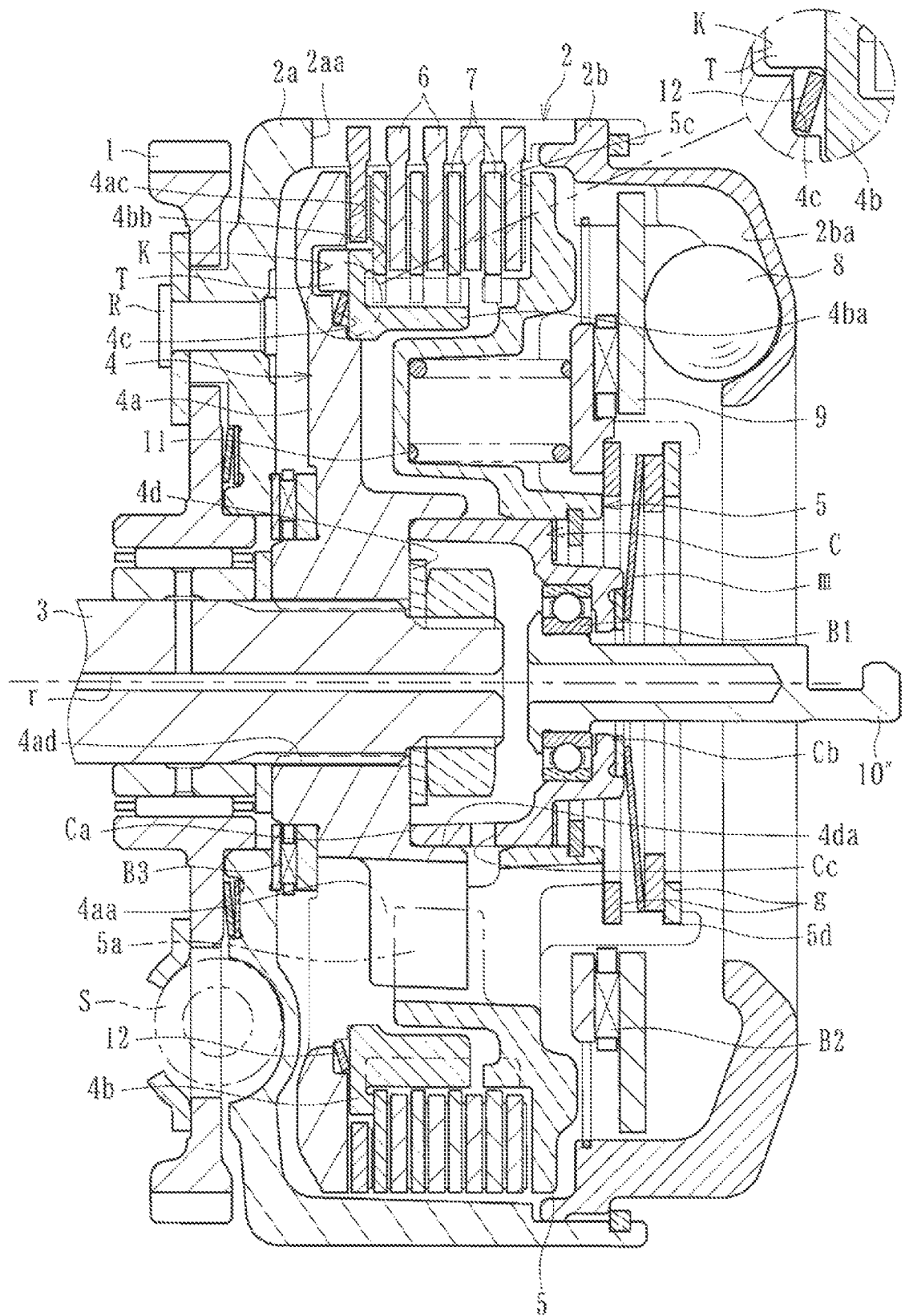

[Fig. 31]
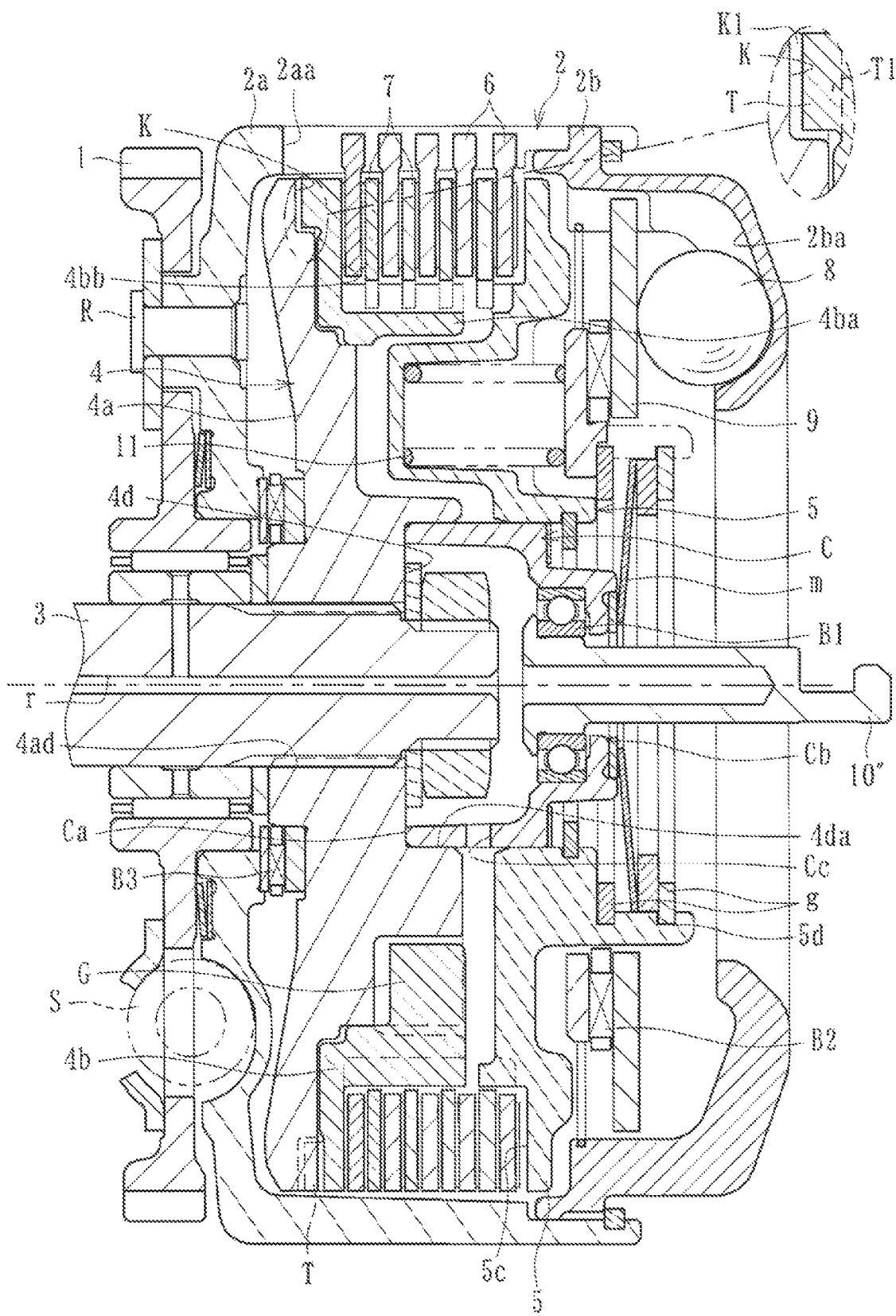

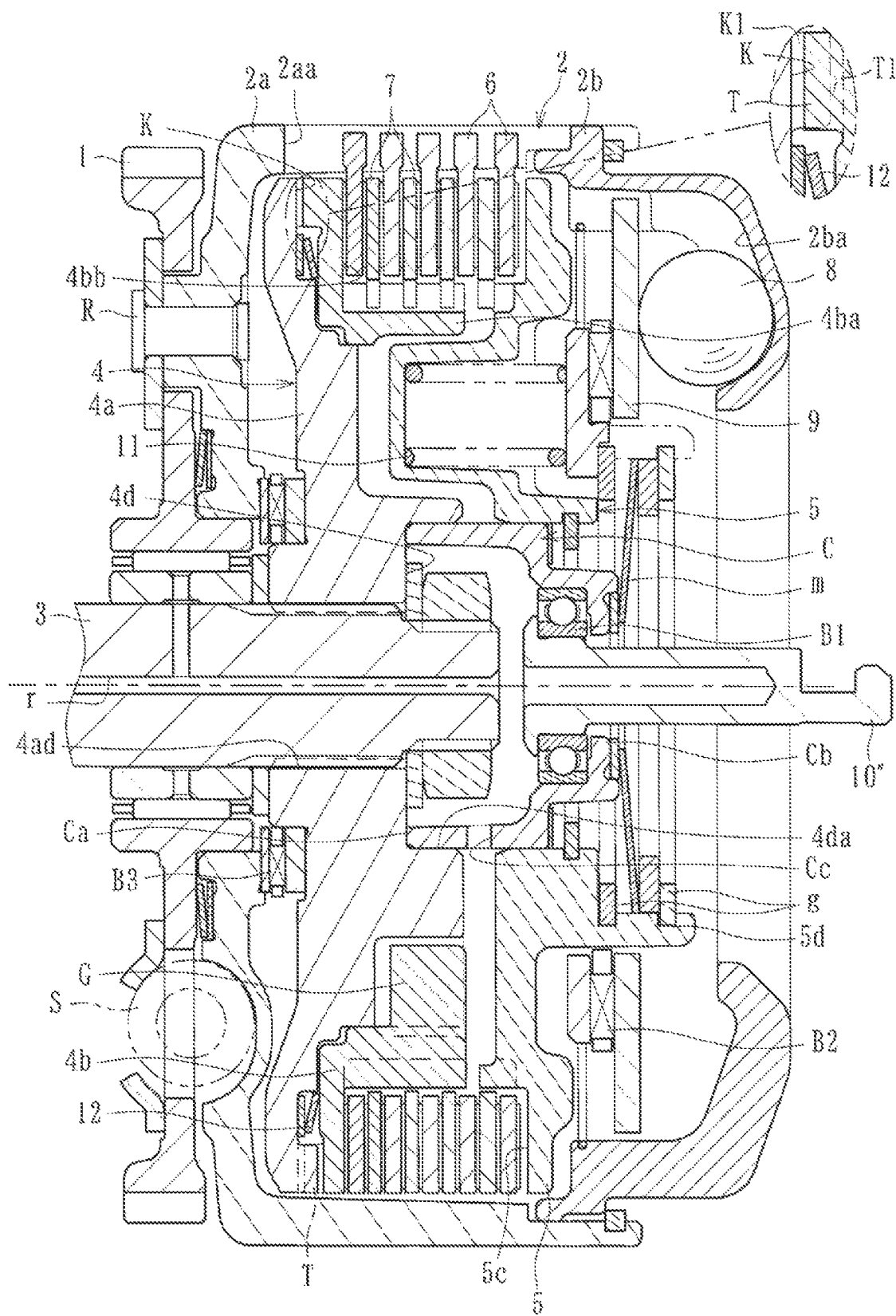
[Fig. 32]

[Fig. 33]
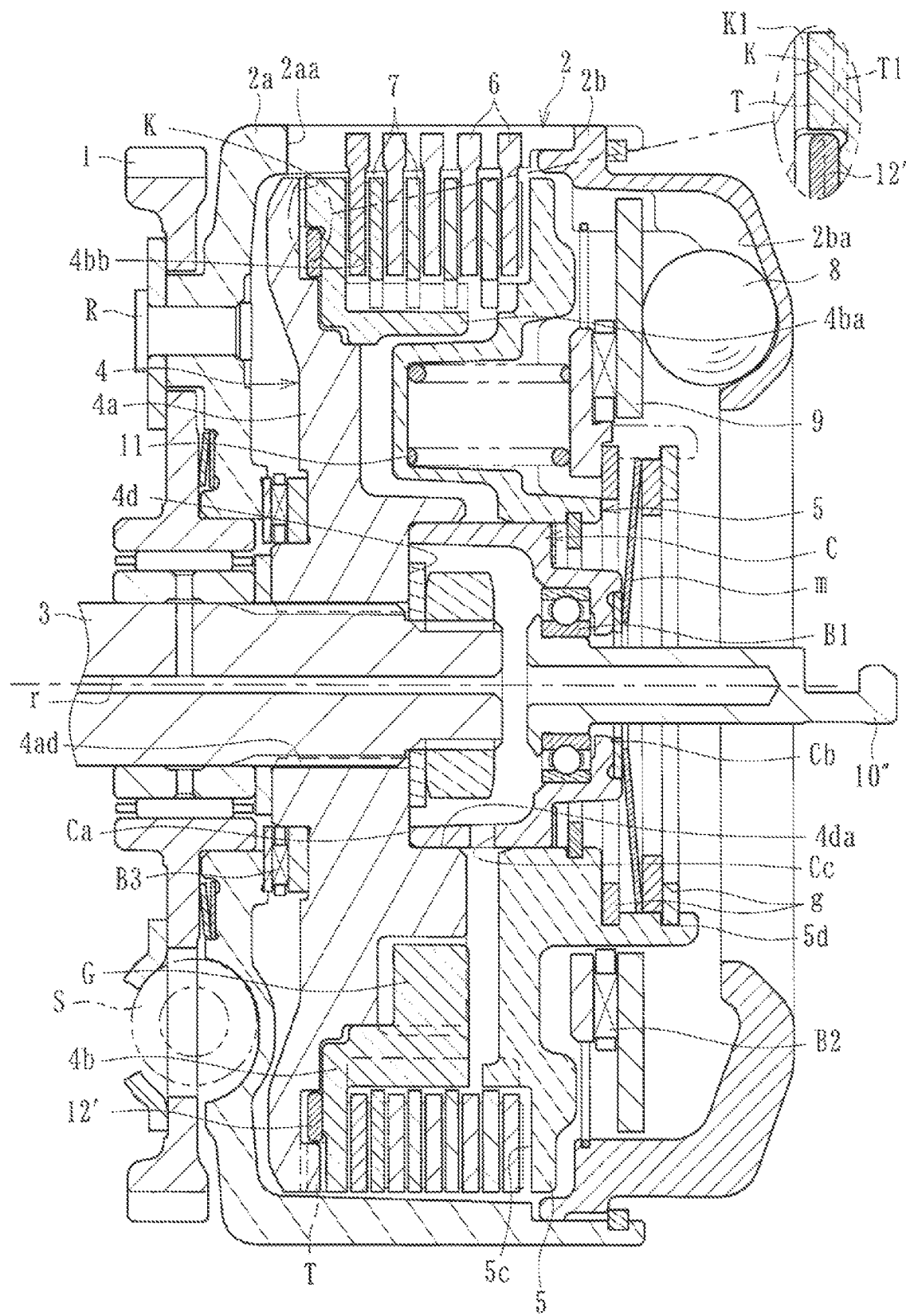

[Fig. 34]
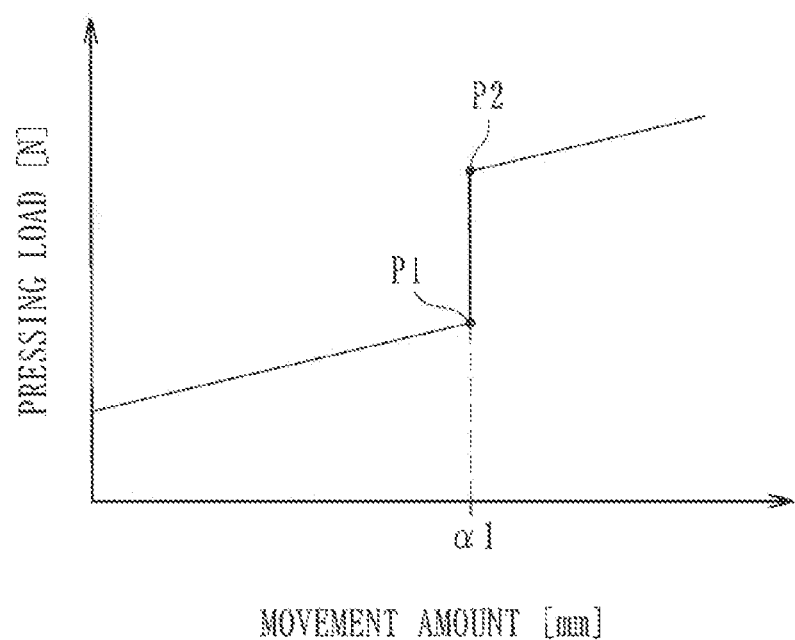

POWER TRANSMISSION DEVICE

CROSS-REFERENCE TO RELATED APPLICATIONS

This application is a continuation of International Application No. PCT/JP2019/047408, filed Dec. 4, 2019, which claims priority to Japanese Application No. 2018-227995, filed Dec. 5, 2018. The disclosures of the above applications are incorporating herein by reference.

FIELD

The present disclosure relates to a power transmission device that can appropriately transmit or stop transmitting rotational power of an input member to an output member.

BACKGROUND

In general, a motorcycle has a power transmission device that is used to appropriately transmit or stop transmitting the engine driving power to a transmission and a driving wheel. The power transmission device includes an input member, coupled to the engine side, an output member, coupled to the transmission and driving wheel side, a clutch member, coupled to an output member, and a pressure member moving toward or away from the clutch member. The power transmission device is configured to transmit power by moving the pressure member toward the clutch member to press a drive-side clutch plate and a driven-side clutch plate against each other. Also, it is configured to stop transmitting the power by moving the pressure member away from the clutch member to release a press-contact force between the drive-side clutch plate and the driven-side clutch plate.

Among existing power transmission devices, as disclosed in, for example, Japanese Unexamined Patent Application Publication No. 2017-155884, a power transmission device including a weight member has been proposed. The weight member can press a drive-side clutch plate and a driven-side clutch plate against each other by moving from a radially-inner position to a radially-outer position in a groove portion due to a centrifugal force generated by rotation of the clutch housing. With the existing power transmission device, since the clutch housing rotates as the engine is driven, it is possible to apply a centrifugal force to the weight member and to transmit the engine driving power to a wheel by pressing the drive-side clutch plate and the driven-side clutch plate against each other.

The existing power transmission device further includes a release spring that is compressed as an interlocking member moves and the pressure member moves from an inactive position toward an active position. Also, it can apply an urging force while allowing movements of the interlocking member and the pressure member until the drive-side clutch plate and the driven-side clutch plate reach an engaged state before being pressed against each other. A clutch spring is compressed in a process where the interlocking member moves after the drive-side clutch plate and the driven-side clutch plate have reached the engaged state. The clutch spring can apply a press-contact force between the drive-side clutch plate and the driven-side clutch plate while allowing movement of the interlocking member.

SUMMARY

However, the existing power transmission device has the following problem.

If the difference between a load (maximum load) at the time when compression of the release spring has been finished (see P1 in FIG. 34) and a load (set load) at the time when compression of the clutch spring is started (see P2 in the figure) is large, in a process where the interlocking member moves and the pressure member moves from the inactive position toward the active position as the rotational speed of the engine increases, a dead zone occurs where the movement of the interlocking member stops (stops while remaining at the movement amount α1 in the figure). This occurs after compression of the release spring has finished and before compression of the clutch spring is started.

Then, when the rotational speed of the engine increases further and the pressing load applied to the interlocking member reaches the set load of the clutch spring (at the time of P2 in the figure), compression of the clutch spring is started. Thus, the interlocking member starts moving again, and the dead zone is passed through. However, because the clutch plates are pressed against each other and the power is transmitted after the dead zone has been passed through, a feeling of surprise occurs when the power is transmitted and operability may be affected.

The present disclosure has been made in consideration of such circumstances. Thus, it is an object to provide a power transmission device that can suppress a feeling of surprise when power is transmitted and can improve operability.

According to the disclosure, a power transmission device comprises a clutch housing that rotates together with an input member that is rotated by the vehicle engine driving power. The clutch housing includes a plurality of drive-side clutch plates. A clutch member includes a plurality of driven-side clutch plates that are formed alternately with the drive-side clutch plates of the clutch housing. The clutch member is coupled to an output member capable of rotating a wheel of the vehicle. A pressure member is movable between an active position and an inactive position. In the active position, the pressure member presses the drive-side clutch plates and the driven-side clutch plates against each other to transmit the engine driving power to the wheel. In the inactive position, the pressure member releases a press-contact force between the drive-side clutch plates and the driven-side clutch plates to be able to stop transmitting the engine driving power to the wheel. A weight member is disposed in a groove portion that extends in a radial direction of the clutch housing. The wheel member is movable from a radially-inner position to a radially-outer position in the groove portion due to a centrifugal force generated by rotation of the clutch housing. An interlocking member moves the pressure member from the inactive position to the active position as the weight member moves from the radially-inner position to the radially-outer position. A release spring holds the pressure member at the inactive position. The spring is compressed as the interlocking member moves and the pressure member moves from the inactive position toward the active position. The release spring applies an urging force while allowing movements of the interlocking member and the pressure member until the drive-side clutch plates and the driven-side clutch plates reach an engaged state before the drive-side clutch plates and the driven-side clutch plates are pressed against each other. A clutch spring is compressed in a process where the interlocking member moves after the drive-side clutch plates and driven-side clutch plates have reached the engaged state. The clutch spring applies a press-contact force between the drive-side clutch plates and the driven-side clutch plates while allowing movement of the interlocking member. A set load of the clutch spring is set to be smaller than a maximum load of the release spring.

According to the disclosure, the power transmission device includes a cushioning member. The cushioning member, by being compressed, applies an urging force while allowing movements of the interlocking member and the pressure member in a process where the interlocking member moves and the pressure member moves from the inactive position toward the active position.

According to the disclosure, the cushioning member includes a spring set to a load such that the spring is compressed before the clutch spring starts to be compressed.

According to the disclosure, it is possible to avoid the occurrence of a dead zone and to improve operability by suppressing a feeling of surprise when power is transmitted. The set load of the clutch spring is set smaller than the maximum load of the release spring. Thus, compression of the release spring and compression of the clutch spring are continuously performed and the interlocking member continuously moves.

According to the disclosure, it is possible to avoid a dead zone as the cushioning member or the clutch spring is continuously compressed in the compression process of the release spring. This further suppress a feeling of surprise when power is transmitted and improve operability. The power transmission device includes the cushioning member, being compressed, applying an urging force while allowing movements of the interlocking member and the pressure member in a process where the interlocking member moves and the pressure member moves from the inactive position toward the active position.

According to the disclosure, it is possible to reliably suppress a feeling of surprise when power is transmitted. Thus, the cushioning member includes a spring set to a load such that the spring is compressed before the clutch spring starts to be compressed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a power transmission device according to an embodiment of the present disclosure.

FIG. 2 is a longitudinal sectional view illustrating the internal structure of the power transmission device.

FIG. 3 is an enlarged cross-section view of drive-side clutch plates, driven-side clutch plates, a back-torque transmitting cam, and the like.

FIG. 4 is a perspective view of a housing portion of a clutch housing.

FIG. 5 is a perspective view of a cover portion of the clutch housing.

FIG. 6 is a three-side plan and elevation view of a first clutch member.

FIG. 7 is a three-side plan and elevation view of a second clutch member.

FIG. 8 is a three-side plan and elevation view of a pressure member.

FIG. 9 is an enlarged perspective view of the first clutch member, the second clutch member, the pressure member, and a bearing holding member.

FIG. 10 is an enlarged perspective view of the first clutch member, the second clutch member, the pressure member, and the bearing holding member.

FIG. 11 is a perspective view of the first clutch member, the second clutch member, the pressure member, and the bearing holding member after being assembled.

FIG. 12 is a three-side plan and elevation view of the bearing holding member.

FIG. 13 is a cross-section view of the function of a press-contact assisting cam.

FIG. 14 is a cross-section view of the function of a back-torque limiter cam.

FIG. 15 is a plan view of the first clutch member and the second clutch member assembled together, in a state where one side surface of a protruding portion and a first contact surface (torque transmitting portion) are in contact with each other.

FIG. 16 is a plan view of the first clutch member and the second clutch member assembled together, in a state where the other side surface of the protruding portion and a second contact surface (movement-amount limiting portion) are in contact with each other.

FIG. 17 is a cross-section view of the function of the back-torque transmitting cam in a state before the back-torque transmitting cam starts working.

FIG. 18 is a cross-section view of the function of the back-torque transmitting cam in a state after the back-torque transmitting cam has started working.

FIG. 19 is a cross-section view of a state where a cushioning member is accommodated in an accommodation recessed portion.

FIG. 20 is a cross-section view of a state where a release spring applies urging forces to both the bearing holding member and the pressure member.

FIG. 21 is a three-side plan and elevation view of the release spring.

FIG. 22 is a graph representing the movement amount and the pressing load of an interlocking member.

FIG. 23 is a graph representing the movement amount and the pressing load of an interlocking member according to another embodiment of the present disclosure.

FIG. 24 is a longitudinal sectional view of a power transmission device according to another embodiment.

FIG. 25 is a longitudinal sectional view of a power transmission device according to another embodiment.

FIG. 26 is a longitudinal sectional view of a power transmission device according to another embodiment.

FIG. 27 is a longitudinal sectional view of a power transmission device according to another embodiment, with a cushioning member and a pull-type activation member.

FIG. 28 is a plan view and a side view of the cushioning member.

FIG. 29 is a perspective view of the cushioning member.

FIG. 30 is a longitudinal sectional view of a power transmission device according to another embodiment with a cushioning member and a pull-type activation member.

FIG. 31 is a longitudinal sectional view of a power transmission device according to another embodiment with a back-torque transmitting cam at an outer edge of a first clutch member.

FIG. 32 is a longitudinal sectional view of a power transmission device according to another embodiment with a back-torque transmitting cam at an outer edge of a first clutch member and a coned-disc spring cushioning member.

FIG. 33 is a longitudinal sectional view of a power transmission device according to another embodiment with a back-torque transmitting cam at an outer edge of a first clutch member 4a and a wave spring cushioning member.

FIG. 34 is a graph representing the movement amount and the pressing load of an interlocking member of an existing power transmission device.

DETAILED DESCRIPTION

Hereafter, an embodiment of the present disclosure will be described in detail with reference to the drawings.

A power transmission device is disposed in a vehicle, such as a motorcycle, and is used to appropriately transmit or to stop transmitting the engine driving power to a transmission or toward the driving wheel side. As illustrated in FIGS. 1 to 12, the power transmission device mainly includes a clutch housing 2 with an input gear 1 (input member) that is rotated by the vehicle engine driving power. A clutch member includes a first clutch member 4a and a second clutch member 4b. A pressure member 5 is attached on the right side in FIG. 2 of the clutch member (the first clutch member 4a and the second clutch member 4b). A plurality of drive-side clutch plates 6 interleaves with a plurality of driven-side clutch plates 7. A weight member 8, including steel ball members, can move (roll) in the radial direction in the clutch housing 2. An interlocking member 9 is included. An activation member 10 can be activated by hand or by an actuator (not shown). The symbol S in the figure shows a spring damper. The symbol B1 shows a roller bearing, and the symbols B2 and B3 respectively show thrust bearings.

The input gear 1 can rotate around an output shaft 3 when the driving power (rotational force) is transmitted from the engine. The input gear 1 is coupled to the clutch housing 2, via a rivet R, or the like. The clutch housing 2 includes a housing portion 2a including a cylindrical member whose right side, in FIG. 2, is open. Also, it is coupled to the input gear 1. A cover portion 2b is attached to close the opening of the housing portion 2a. The clutch housing 2 can rotate together with the rotation of the input gear 1 due to the driving power of the engine.

As illustrated in FIG. 4, a plurality of cutouts 2aa are formed in the housing portion 2a of the clutch housing 2, arranged in the circumferential direction, and receive the plurality of drive-side clutch plates 6. Each of the drive-side clutch plates 6 includes a substantially annular plate material and is configured to be able to rotate with the rotation of the clutch housing 2 and to slide in the axial direction (the left-right direction in FIG. 2).

Moreover, as illustrated in FIG. 5, a plurality of groove portions 2ba, extending in the radial direction of the cover portion 2b, are formed in the bottom surface of the cover portion 2b of the clutch housing 2. The weight member 8 is disposed in each of the groove portions 2ba. In a state where the clutch housing 2 is stopped (an engine stop or idling state) and in a state where the clutch housing 2 is rotating at a low speed, the weight member 8 is located at a radially-inner position (the position shown in FIG. 2). In a state where the clutch housing 2 is rotating at a high speed, the weight member 8 is located at a radially-outer position.

The plurality of driven-side clutch plates 7, alternately positioned with the drive-side clutch plates 6 of the clutch housing 2, are attached to the clutch member (the first clutch member 4a and the second clutch member 4b). The clutch member is coupled to the output shaft 3 (output member) that can rotate the wheel of the vehicle. The clutch member is configured by assembling two members, which are the first clutch member 4a and the second clutch member 4b.

As illustrated in FIG. 6, the first clutch member 4a includes a disc-shaped member with a flange surface 4ac formed along the peripheral edge part. The first clutch member 4a is configured so that the output shaft 3 is inserted into an insertion hole 4ad (see FIGS. 2 and 6) formed at the center. The first clutch member 4a and the output shaft 3 are coupled to each other in the rotational direction as gears respectively formed therein mesh with each other. FIGS. 6, 9, and 10 illustrate, formed in the first clutch member 4a, an inclined surface 4aa, that constitutes a press-contact assisting cam, and inclined surface 4ab, that constitutes a back-torque limiter cam.

As illustrated in FIG. 7, the second clutch member 4b includes an annular member that includes the driven-side clutch plates 7 attached by spline fitting to a spline-fitting portion 4ba (see FIGS. 2 and 7) formed in an outer peripheral surface. As illustrated in FIGS. 9 to 11, the pressure member 5 is assembled with the clutch member (the first clutch member 4a and the second clutch member 4b). The plurality of drive-side clutch plates 6 and the driven-side clutch plates 7, stacked alternately, are attached between a flange surface 5c of the pressure member 5 (see FIGS. 2 and 8) and the flange surface 4ac of the first clutch member 4a (see FIGS. 2 and 6).

As illustrated in FIG. 8, the pressure member 5 includes a disc-shaped member with the flange surface 5c formed along the peripheral edge part. The pressure member 5 is movable between an active position and an inactive position. In the active position, the pressure member 5 presses the drive-side clutch plates 6 and the driven-side clutch plates 7 against each other to be able to transmit the engine driving power to the wheel. In the inactive position (see FIG. 2), the pressure member 5 releases the press-contact force between the drive-side clutch plates 6 and the driven-side clutch plates 7 to be able to stop transmitting the engine driving power to the wheel.

To be more specific, as illustrated in FIGS. 7, 9 and 10, the spline-fitting portion 4ba, formed in the second clutch member 4b, has a protruding/recessed shape that is integrally formed along substantially the entire circumference of the outer peripheral side surface of the second clutch member 4b. When the driven-side clutch plates 7 are fit into recessed grooves of the spline-fitting portion 4ba, movement of the driven-side clutch plates 7 in the rotational direction is restricted while movement of the driven-side clutch plates 7 relative to the second clutch member 4b in the axial direction is allowed. The driven-side clutch plates 7 can rotate together with the second clutch member 4b.

The driven-side clutch plates 7 are stacked alternately with the drive-side clutch plates 6. The clutch plates 6 and 7 can be pressed against each other or the press-contact force therebetween can be released. That is, both clutch plates 6 and 7 are allowed to slide in the axial direction of the second clutch member 4b. When the pressure member 5 moves leftward in FIG. 2 and the flange surface 5c moves toward the flange surface 4ac of the first clutch member 4a. Both clutch plates 6 and 7 are pressed against each other to transmit a rotational force of the clutch housing 2 to the output shaft 3, via the second clutch member 4b and the first clutch member 4a. When the pressure member 5 moves rightward in FIG. 2, the flange surface 5c and the flange surface 4ac of the first clutch member 4a become separated from each other. The press-contact force between the clutch plates 6 and 7 is released and the first clutch member 4a and the second clutch member 4b stop following the rotation of the clutch housing 2. Thus, transmission of a rotational force to the output shaft 3 is stopped.

In the state where the drive-side clutch plates 6 and the driven-side clutch plates 7 are pressed against each other, a rotational force engine driving power input to the clutch housing 2 is transmitted to the wheel side via the output shaft 3 (output member). In the state where the press contact between the drive-side clutch plates 6 and the driven-side clutch plates 7 is released, a rotational force (engine driving power) input to the clutch housing 2 can be stopped from being transmitted to the output shaft 3 (output member).

Moreover, as illustrated in FIGS. 6, 8, 9, and 10, in the present embodiment, the inclined surfaces 4aa and 4ab are formed in the first clutch member 4a and the inclined surfaces 5a and 5b, that face the inclined surfaces 4aa and 4ab, are formed in the pressure member 5. That is, the inclined surface 4aa and the inclined surface 5a contact other to provide a press-contact assisting cam. The inclined surface 4ab and the inclined surface 5b contact each other to provide a back-torque limiter cam.

As illustrated in FIG. 13, a rotational force in the direction (a) is applied to the pressure member 5 when the rotational speed of the engine increases and a rotational force input to the input gear 1 and the clutch housing 2 becomes capable of being transmitted to the output shaft 3, via the first clutch member 4a and the second clutch member 4b. Here, the weight member 8 is at the radially-outer position. Therefore, a force in the direction (c) in the figure is generated in the pressure member 5 due to the function of the press-contact assisting cam. Thus, the flange surface 5c of the pressure member 5 moves in a direction (leftward in FIG. 2) further toward the flange surface 4ac of the first clutch member 4a. Thus, the pressure member 5 increases the press-contact force between the drive-side clutch plates 6 and the driven-side clutch plates 7.

On the other hand, while the vehicle is traveling, when the rotational speed of the output shaft 3 exceeds the rotational speed of the input gear 1 and the clutch housing 2 and a back torque in the direction (b) in FIG. 14 is generated, due to the function of the back-torque limiter cam, the pressure member 5 is moved in the direction (d) in the figure to release the press-contact force between the drive-side clutch plates 6 and the driven-side clutch plates 7. Thus, it is possible to avoid damage to the power transmission device and the power source (engine side) due to the back torque.

The weight member 8 is disposed in the groove portion 2ba extending in the radial direction of the clutch housing 2 (in the present embodiment, the cover portion 2b). The weight member 8 moves from a radially-inner position (see FIG. 2) to a radially-outer position in the groove portion 2ba due to a centrifugal force, generated as the clutch housing 2 rotates. This presses the drive-side clutch plates 6 and the driven-side clutch plates 7 against each other. That is, the rolling surface (bottom surface) of the groove portions 2ba, where the weight member 8 rolls, has an upward inclination from the radially-inner position toward the radially-outer position. When the clutch housing 2 is stopped, the weight member 8 is held at the radially-inner position due to an urging force of a release spring (m). When the clutch housing 2 rotates, a centrifugal force is applied to the weight member 8 and moves the weight member 8 along the upward inclination to the radially-outer position as the clutch housing 2 reaches a predetermined rotational speed.

The interlocking member 9 includes an annular member disposed in the clutch housing 2 (the cover portion 2b). The interlocking member 9 is fit and coupled to a groove portion formed in an inner peripheral surface of the cover portion 2b. It is rotatable together with the clutch housing 2 and is movable in the left-right direction in FIG. 2. As the weight member 8 moves from the radially-inner position to the radially-outer position, the interlocking member 9 moves leftward in FIG. 2 against urging forces of a clutch spring 11 and the release spring (m). It presses the pressure member 5 to move the pressure member 5 from the inactive position to the active position.

The activation member 10 includes a member operated by hand or by an actuator (see FIG. 2). It moves the pressure member 5 in a direction (rightward in FIG. 2) such that the press-contact force between the drive-side clutch plates 6 and the driven-side clutch plates 7 can be released. When a shifting operation is performed, for example, by an operation on a clutch pedal, a clutch lever, or the like of the vehicle, or by working of an actuator, the activation member 10 moves rightward in FIG. 2 to contact the pressure member 5, via a bearing holding member C, and moves the pressure member 5 from the active position to the inactive position. Thus, the activation member 10 can disengage the clutch (stop transmitting the power) by releasing the press-contact force between the drive-side clutch plates 6 and the driven-side clutch plates 7.

As illustrated in FIG. 2, the bearing holding member C, coupled to the activation member 10, holds a bearing B1 interposed between the activation member 10 and the pressure member 5. As illustrated in FIG. 12, the bearing holding member C includes a cylindrical member with one open end. It includes an open end portion Ca and a top portion Cb on the opposite side of the open end portion Ca. The bearing B1, according to the present embodiment, is attached to the top portion Cb side in the bearing holding member C. A cylindrical part extends from an increased-diameter part to the open end portion Ca. Although, for example, a ball bearing is used as the bearing B1, according to the present embodiment, another bearing such as a needle bearing may be used.

Moreover, as illustrated in FIGS. 2 and 20, the open end portion Ca of the bearing holding member C according to the present embodiment, is fit into and attached to a recessed portion 4d formed in the clutch member (the first clutch member 4a). It is assembled with an inner peripheral wall surface 4da of the recessed portion 4d by socket-and-spigot joint (fitting joint). The recessed portion 4d includes a circular depression with a shape similar to and a size substantially the same as the outer shape of the open end portion Ca (to be strict, a size slightly larger than the open end portion Ca). By fitting the bearing holding member C into the recessed portion 4d, positioning and centering relative to the power transmission device are performed.

In a shifting operation, when the activation member 10 moves rightward in FIG. 2 by, for example, an operation on a clutch pedal, a clutch lever, or the like of the vehicle or by working of an actuator, the bearing holding member C moves together and contacts the pressure member 5. This moves the pressure member 5 from the active position to the inactive position. Thus, the clutch is disengaged (transmission of power is stopped) by releasing the press-contact force between the drive-side clutch plates 6 and the driven-side clutch plates 7.

The release spring (m) can hold the pressure member 5 at the inactive position. The release spring (m) is compressed as the interlocking member 9 moves and the pressure member 5 moves from the inactive position toward the active position. The release spring (m) can apply an urging force while allowing movements of the interlocking member 9 and the pressure member 5 until the drive-side clutch plates 6 and the driven-side clutch plates 7 reach an engaged state before being pressed against each other. Thus, a state where the distance between the drive-side clutch plates 6 and the driven-side clutch plates 7 is zero and immediately before power transmission due to pressed contact is performed.

Moreover, as illustrated in FIG. 21, the release spring (m) according to the present embodiment, includes a coned-disc spring that generates an urging force due to a displacement between a middle part (ma) and a peripheral edge part (mb). As illustrated in FIGS. 2 and 20, the middle part (ma) is attached to the top portion Cb of the bearing holding member C. The peripheral edge part (mb) is attached to the pressure member 5. The pressure member 5 has a projecting portion 5d that projects annularly. The peripheral edge part (mb) of the release spring (m) is engaged with and attached to a ring-shaped member g (for example, a circlip and the like) attached to the projecting portion 5d. Thus, the release spring (m), according to the present embodiment, is attached to both of the bearing holding member C and the pressure member 5. The release spring (m) applies an urging force (an urging force in an orientation indicated by a numeral a2 in FIG. 20) to the pressure member 5 and an urging force (an urging force in an orientation indicated by a symbol a1 in the figure) to the bearing holding member C. This transmits the urging force to the activation member 10.

The clutch spring 11 includes a coil spring interposed between the interlocking member 9 and the pressure member 5. As the interlocking member 9 moves, the clutch spring 11 presses the pressure member 5 to move the pressure member 5 in a direction such that the drive-side clutch plates 6 and the driven-side clutch plates 7 are pressed against each other. Moreover, when the activation member 10 is working, the clutch spring 11 can absorb the pressing force that the pressure member 5 applies to the interlocking member 9.

The clutch spring 11, according to the present embodiment, is compressed in the process where the interlocking member 9 moves, applies a press-contact force between the drive-side clutch plates 6 and the driven-side clutch plates 7 while allowing movement of the interlocking member 9 before the drive-side clutch plates 6 and the driven-side clutch plates 7 reach the engaged state described above.

Thus, when the weight member 8 moves from the radially-inner position to the radially-outer position and the interlocking member 9 is pressed by the weight member 8 as the clutch housing 2 rotates, the pressing force is transmitted to the pressure member 5 via the clutch spring 11. This moves the pressure member 5 leftward in FIG. 2 and presses the drive-side clutch plates 6 and the driven-side clutch plates 7 against each other. When the activation member 10 is activated in this state, although the pressure member 5 moves rightward in the figure due to the pressing force of the activation member 10, the pressing force applied to the interlocking member 9 is absorbed by the clutch spring 11. Thus, the position of the interlocking member 9 (the position of the weight member 8) is maintained.

Here, the power transmission device, according to the present embodiment, includes a back-torque transmitting cam (cam surfaces K1 and T1). The back-torque transmitting cam moves the second clutch member 4b to press the drive-side clutch plates 6 and the driven-side clutch plates 7 against each other, when a rotational force is input to the first clutch member 4a via the output shaft 3 (output member). As illustrated in FIGS. 6, 7, 9, and 10, the back-torque transmitting cam includes cam surfaces (K1, T1) that are respectively integrally formed in mating surfaces of the first clutch member 4a and the second clutch member 4b (mating surfaces when combined).

As illustrated in FIGS. 6 and 9, the cam surface K1 includes a plurality of inclined surfaces formed along the entire circumference of the radially-inner side of the flange surface 4ac of the first clutch member 4a (the mating surface with the second clutch member 4b). The cam surface K1 is formed in one end surface of each of a plurality of groove portions K that are annularly formed along the peripheral edge part of the first clutch member 4a. That is, the plurality of groove portions K are formed in the first clutch member 4a so as to be arranged in the circumferential direction. One end surface of each groove portion K is an inclined surface that constitutes the cam surface K1 of the back-torque transmitting cam. The other end surface of each groove portion K is a wall surface K2 extending in the axial direction of the first clutch member 4a.

As illustrated in FIGS. 7 and 10, the cam surface T1 includes a plurality of inclined surfaces formed along the entire circumference of the bottom surface of the second clutch member 4b (the mating surface with the first clutch member 4a). The cam surface T1 is formed in one end surface of each of a plurality of projecting portions T that are annularly formed along the bottom surface of the second clutch member 4b. That is, the plurality of projecting portions T are formed in the second clutch member 4b so as to be arranged in the circumferential direction. One end surface of each projecting portion T is an inclined surface that constitutes the cam surface T1 of the back-torque transmitting cam. The other end surface of each projecting portion T is a wall surface T2 extending in the axial direction of the second clutch member 4b.

As illustrated in FIG. 17, the projecting portion T is fit into the groove portion K to combine the first clutch member 4a and the second clutch member 4b with each other. The cam surface K1 and the cam surface T1 face each other to constitute the back-torque transmitting cam. The wall surface K2 and the wall surface T2 face each other with a predetermined distance therebetween. When a rotational force is input to the first clutch member 4a, via the output shaft 3, the first clutch member 4a rotates relative to the second clutch member 4b, as illustrated in FIG. 18. The second clutch member 4b is moved rightward in FIGS. 2 and 18 relative to the first clutch member 4a due to the cam function of the cam surface K1 and the cam surface T1.

As illustrated in FIG. 7, a pressing portion 4bb is formed in the second clutch member 4b on an extension line of the spline-fitting portion 4ba. When the second clutch member 4b moves rightward in FIG. 2, the pressing portion 4bb presses in the same direction as the driven-side clutch plate 7 on the leftmost side in the figure, which is one of the drive-side clutch plates 6 and the driven-side clutch plates 7 that are attached in a stacked state. Thus, even when the pressure member 5 is at the inactive position, it is possible to press the drive-side clutch plates 6 and the driven-side clutch plates 7 against each other. Thus, when a rotational force is input from the output shaft 3 (output member), it is possible to transmit a rotational force to the engine side to apply an engine brake.

In particular, the back-torque transmitting cam according to the present embodiment, moves the second clutch member 4b in a direction toward the interlocking member 9 (rightward in FIG. 2) to maintain contact between the interlocking member 9 and the weight member 8. That is, when the back-torque transmitting cam starts working and moves the second clutch member 4b rightward in FIG. 2, the back-torque transmitting cam presses the drive-side clutch plates 6 and the driven-side clutch plates 7 against each other and presses the pressure member 5 in the same direction. Therefore, the pressing force is transmitted to the interlocking member 9 via the clutch spring 11, and contact between the interlocking member 9 and the weight member 8 is maintained.

If the interlocking member 9 and the weight member 8 are separated from each other when the back-torque transmitting cam is working, even when the weight member 8 subsequently moves between the radially-inner position and the radially-outer position as the clutch housing 2 rotates, it may not be possible for the interlocking member 9 to follow the movement. In contrast, with the present embodiment, it is possible to maintain contact between the interlocking member 9 and the weight member 8 even when the back-torque transmitting cam is working. Thus, the interlocking member 9 can stably follow the movement of the weight member 8.

The plurality of the cam surfaces K1 and T1 of the back-torque transmitting cam, according to the present embodiment, are formed along the annular shape of the driven-side clutch plates 7 attached to the second clutch member 4b. That is, the cam surfaces K1 and T1 are formed along the projected-image shape (annular shape) of the driven-side clutch plates 7 that are pressed by the pressing portion 4bb when the back-torque transmitting cam works. Thus, due to the cam function of the back-torque transmitting cam, the pressing portion 4bb can apply a substantially uniform pressing force to the driven-side clutch plates 7. Thus, it is possible to press the drive-side clutch plates 6 and the driven-side clutch plates 7 against each other more efficiency.

Furthermore, the back-torque transmitting cam, according to the present embodiment, (a cam constituted by the cam surface K1 and the cam surface T1) can start working before the back-torque limiter cam (a cam constituted by the inclined surface 4ab and the inclined surface 5b) starts working. That is, the clearance (the dimension of the gap) between the cam surface K1 and the cam surface T1 is smaller than the clearance (the dimension of the gap) between the inclined surface 4ab and the inclined surface 5b. Accordingly, the back-torque transmitting cam can start working before the back-torque limiter cam starts working.

Moreover, the power transmission device, according to the present embodiment, includes a torque transmitting portion formed in each of the first clutch member 4a and the second clutch member 4b. It can transmit a rotational force, that has been transmitted to the second clutch member 4b, to the first clutch member 4a without using the back-torque transmitting cam (the cam surfaces K1 and the cam surfaces T1). A movement-amount limiting portion, formed in each of the first clutch member 4a and the second clutch member 4b, limits the movement amount of the second clutch member 4b due to the back-torque transmitting cam (the cam surfaces K1 and the cam surfaces T1).

That is, as illustrated in FIGS. 6 and 9, a plurality of (in the present embodiment, three) protruding portions F are integrally formed in the first clutch member 4a and arranged at regular intervals in the circumferential direction. As illustrated in FIGS. 7 and 9, projecting portions G, extending inward, are integrally formed in the second clutch member 4b. As illustrated in FIGS. 15 and 16, when the first clutch member 4a and the second clutch member 4b are assembled together, one protruding portion F is interposed between two projecting portions G. Also, one side surface F1 of the protruding portion F and the contact surface (first contact surface G1) of one of the projecting portions G face each other. The other side surface F2 of the protruding portion F and the contact surface (second contact surface G2) of the other projecting portion G face each other.

One side surface F1 of the protruding portion F, formed in the first clutch member 4a, and the first contact surface G1 of the projecting portion G, formed in the second clutch member 4b, constitute the torque transmitting portion according to the present embodiment. The pressure member 5 moves to the active position to press the drive-side clutch plates 6 and the driven-side clutch plates 7 against each other. The clutch is engaged (driving power is transmitted), while the wall surface K2 of the groove portion K and the wall surface T2 of the projecting portion T of the back-torque transmitting cam are maintained in a separated state (see FIG. 17), as illustrated in FIG. 15, one side surface F1 of the protruding portion F and the first contact surface G1 of the projecting portion G contact each other. A rotational force of the second clutch member 4b can be received and transmitted to the first clutch member 4a.

The other side surface F2 of the protruding portion F, formed in the first clutch member 4a, and the second contact surface G2 of the other projecting portion G, formed in the second clutch member 4b, constitute the movement-amount limiting portion, according to the present embodiment. That is, when a rotational force is input to the first clutch member 4a via the output shaft 3, the first clutch member 4a and the second clutch member 4b rotate relative to each other. Therefore, the second clutch member 4b moves (see FIG. 18) due to the cam function of the cam surface K1 of the groove portion K and the cam surface T1 of the projecting portion T of the back-torque transmitting cam. When the movement amount reaches a set value, as illustrated in FIG. 16, the other side surface F2 of the protruding portion F and the second contact surface G2 of the projecting portion G contact each other. Thus, rotation of the second clutch member 4b relative to the first clutch member 4a is restricted. Therefore, it is possible to limit the movement amount of the second clutch member 4b when the back-torque transmitting cam is working.

In the present embodiment, the protruding portion F is formed in the first clutch member 4a, and the projecting portion G is formed in the second clutch member 4b. Alternatively, the projecting portion G may be formed in the first clutch member 4a, and the protruding portion F may be formed in the second clutch member 4b. In this case, one side surface F1 of the protruding portion F, formed in the second clutch member 4b, and the first contact surface G1 of one projecting portion G, formed in the first clutch member 4a, constitute the torque transmitting portion, according to the present embodiment. The other side surface F2 of the protruding portion F, formed in the second clutch member 4b, and the second contact surface G2 of the other projecting portion G, formed in the first clutch member 4a, constitute the movement-amount limiting portion according to the present embodiment.

Next, the function of the back-torque transmitting cam in the present embodiment will be described.

As illustrated in FIG. 2, when the engine is stopped or idling, the weight member 8 is at the radially-inner position and the pressure member 5 is at the inactive position, because the engine driving power is not transmitted to the input gear 1 or the rotational speed of the input gear 1 is low. At this time, when a rotational force is input to the first clutch member 4a, via the output shaft 3 (output member), due to the cam function of the back-torque transmitting cam, the second clutch member 4b moves rightward in the figure. The drive-side clutch plates 6 and the driven-side clutch plates 7 are pressed against each other to transmit a rotational force to the engine side.

When the vehicle starts to move after having been stopped or idling, the rotational speed of the input gear 1 changes from a low rotational speed to a high rotational speed (middle rotational speed range). The weight member 8 is located between the radially-inner position and the radially-outer position and the pressure member 5 is located at the active position. At this time, when a rotational force is input to the first clutch member 4a via the output shaft 3 (output member) as, for example, acceleration pedal is released on a downward slope, due to the cam function of the back-torque transmitting cam, the second clutch member 4b moves rightward in the figure. The drive-side clutch plates 6 and the driven-side clutch plates 7 are pressed against each other to transmit a rotational force to the engine side.

After the vehicle has started, when the vehicle accelerates and travels in a high speed range, the weight member 8 is located at the radially-outer position and the pressure member 5 is located at the active position because the rotational speed of the input gear 1 is a high rotational speed. At this time, when a rotational force is input to the first clutch member 4a, via the output shaft 3 (output member) in response to shift down or the like, due to the cam function of the back-torque transmitting cam, the second clutch member 4b moves rightward in the figure. Thus, the drive-side clutch plates 6 and the driven-side clutch plates 7 are pressed against each other to transmit a rotational force to the engine side.

Here, in the power transmission device according to the present embodiment, the set load of the clutch spring 11 is set smaller than the maximum load of the release spring (m). Thus, when the rotational speed of the engine increases and the weight member 8 moves from the radially-inner position to the radially-outer position, where the process in which the interlocking member 9 is pressed by the weight member 8 and moves, when the release spring m is compressed and exceeds the set load of the clutch spring 11, the clutch spring 11 is started to be compressed, and therefore it is possible to avoid occurrence of a dead zone.

Next, the function of the power transmission device, according to the present embodiment, will be described in comparison with an existing power transmission device where the set load of the clutch spring is set to be larger than the maximum load of the release spring.

First, the function of the existing power transmission device will be described with reference to the graph of FIG. 34. The graph has the movement amount (mm) of the interlocking member 9 along the horizontal axis and the pressing load (N) generated in the interlocking member 9 along the vertical axis. In the graph of FIG. 34, P1 indicates the pressing load of the interlocking member 9 at a time when the deformation amount (compression amount) of the release spring (m) is the maximum (at a time of reaching the maximum load of the release spring (m)). P2 indicates the pressing load of the interlocking member 9 at a time when the clutch spring 11 starts to be deformed (at a time of reaching the set load of the clutch spring 11).

In the process where the rotational speed of the engine increases and the weight member 8 moves from the radially-inner position to the radially-outer position to move the interlocking member 9, the release spring (m) is deformed and the clutch spring 11 is not deformed (that is, the interlocking member 9 and the pressure member 5 move together) until the movement amount of the interlocking member 9 reaches α1. When the movement amount of the interlocking member 9 reaches α1, although the pressing load (N) increases from P1 to P2, the interlocking member 9 stops moving, and becomes or creates a dead zone.

When the pressing load (N) reaches P2 (the set load of the clutch spring 11) from such a state, the clutch spring 11 starts to be deformed, and the pressing load (N) increases in accordance with the movement of the interlocking member 9. Thus, the interlocking member 9 and the pressure member 5 stop until the pressing load (N) reaches from P1 to P2. After the pressing load (N) has reached P2, the clutch spring 11 starts to be compressed. The clutch plates (the drive-side clutch plates 6 and the driven-side clutch plates 7) are pressed against each other to transmit power. Thus, a feeling of surprise occurs when power is transmitted.

In contrast, in the present embodiment, the set load P2 of the clutch spring 11 is set to be smaller than the maximum load P1 of the release spring (m). Therefore, as illustrated in FIG. 22, in the process where the interlocking member 9 moves, the release spring (m) is compressed and deformed, and, when the movement amount of the interlocking member 9 reaches α2, the release spring (m) reaches the set load P2 of the clutch spring 11 and the clutch spring 11 starts to be compressed (deformed). Subsequently, when the movement amount of the interlocking member 9 reaches α1, the release spring (m) reaches the maximum load P1 and while the release spring (m) is stopped to be compressed (deformed) further, the clutch spring 11 is compressed and deformed, and thus the interlocking member 9 continuously moves.

That is, according to the present graph, in the process where the rotational speed of the engine increases and the weight member 8 moves from the radially-inner position to the radially-outer position and thus the interlocking member 9 moves, the release spring (m) is continuously compressed (deformed) until the movement amount of the interlocking member 9 reaches α2. When the movement amount of the interlocking member 9 becomes α2 and the pressing load (N) reaches the set load P2 of the clutch spring 11, the clutch spring 11 starts to be deformed together with the release spring (m). Subsequently, when the movement amount of the interlocking member 9 reaches α1, while the release spring (m) reaches the maximum load P1 and is stopped to be deformed, the clutch spring 11 is continued to be deformed (compressed), and thus the interlocking member 9 continuously moves.

Accordingly, before the movement amount of the interlocking member 9 becomes α1 (before the pressing load becomes P1), only the release spring (m) is deformed until the movement amount of the interlocking member 9 becomes α2. Thus, both the release spring (m) and the clutch spring 11 are deformed until the movement amount of the interlocking member 9 becomes α1 and the interlocking member 9 continuously moves. When the movement amount of the interlocking member 9 becomes α1 and the pressing load reaches the maximum load P1 of the release spring, while the release spring (m) is stopped to be deformed, the clutch spring 11 is continued to be deformed and the interlocking member 9 is allowed to move continuously. Thus, it is possible to reduce the existing dead zone and to move the weight member 8 and the interlocking member 9 smoothly and continuously. Therefore, it is possible to suppress shock when the clutch is engaged and to suppress a feeling of surprise when power is transmitted.

The present embodiment does not have a spring or the like between the first clutch member 4a and the second clutch member 4b. However, for example, a cushioning member 12 may be disposed between the first clutch member 4a and the second clutch member 4b. In this case, the cushioning member 12 is interposed between the first clutch member 4a and the second clutch member 4b. The cushioning member, while being compressed (deformed), applies an urging force allowing movements of the interlocking member 9 and the pressure member 5 in the process where the interlocking member 9 moves and the pressure member 5 moves from the inactive position toward the active position.

To be more specific, the cushioning member 12 includes a spring that is set to a load such that the spring is compressed before the clutch spring 11 starts to be compressed. As illustrated in FIGS. 2, 3, and 19, the cushioning member 12 is assembled, by being accommodated in an accommodation recessed portion 4c formed in a surface where the first clutch member 4a and the second clutch member 4b face each other. Specifically, a surface of the first clutch member 4a facing the second clutch member 4b.

The accommodation recessed portion 4c includes an annular groove. The cushioning member 12 includes a coned-disc spring with an annular shape conformed to the shape of the groove. As illustrated in FIG. 19, the accommodation recessed portion 4c includes a groove with a wall surface 4ca on the radially-inner side and a wall surface 4cb on the radially-outer side. The cushioning member 12, including an annular spring, is conformed to the shape of the groove and fit into the accommodation recessed portion 4c.

The back-torque transmitting cam, according to the present embodiment, is formed in a plurality of annular shapes in a surface where the first clutch member 4a and the second clutch member 4b face each other. As illustrated in FIG. 6, the accommodation recessed portion 4c is formed in a concentric circular shape at a position that is adjacent to the back-torque transmitting cam. In the present embodiment, it is on the radially-inner side of the position where the back-torque transmitting cam is formed.

The cushioning member 12 is set to a load (P3) such that the cushioning member 12 is compressed before the clutch spring 11 starts to be compressed. Therefore, as illustrated in FIG. 23, before the movement amount of the interlocking member 9 becomes α1 (before the pressing load becomes P1), only the release spring (m) is deformed until the movement amount of the interlocking member 9 becomes α2. Thus, both the release spring (m) and the clutch spring 11 are deformed until the movement amount of the interlocking member 9 becomes α3. Subsequently, all of the release spring (m), the clutch spring 11, and the cushioning member 12 are deformed until the movement amount of the interlocking member 9 becomes α1 and thus the interlocking member 9 continuously moves. When the movement amount of the interlocking member 9 becomes α1 and the pressing load reaches the maximum load P1 of the release spring (the maximum load of the cushioning member 12), while the release spring (m) and the cushioning member 12 are stopped from being deformed, the clutch spring 11 continues to be deformed, and thus the interlocking member 9 is allowed to move continuously. Thus, also in this case, it is possible to reduce the existing dead zone and to move the weight member 8 and the interlocking member 9 smoothly and continuously. Therefore, it is possible to suppress shock when the clutch is engaged and to suppress a feeling of surprise when power is transmitted.

In a case where the cushioning member 12 is disposed as described above, the accommodation recessed portion 4c is formed in a concentric circular shape at a position on the radially-inner side of the position of the back-torque transmitting cam. However, the accommodation recessed portion 4c may be formed in a concentric circular shape at a position on the radially-outer side of the position of the back-torque transmitting cam. In this case, as illustrated in FIG. 24, the cushioning member 12 may be configured to apply an urging force to a part (disc pack), where the drive-side clutch plates 6 and the driven-side clutch plates 7 are stacked, in a direction such that the drive-side clutch plates 6 and the driven-side clutch plates 7 are pressed against each other.

With the present embodiment, because the set load of the clutch spring 11 is set to be smaller than the maximum load of the release spring (m), compression of the release spring (m) and compression of the clutch spring 11 are continuously performed and the interlocking member 9 continuously moves. Therefore, it is possible to avoid occurrence of a dead zone and to improve operability by suppressing a feeling of surprise when power is transmitted.

In a case where the power transmission device includes the cushioning member 12, being compressed, applying an urging force while allowing movements of the interlocking member 9 and the pressure member 5 in the process where the interlocking member 9 moves and the pressure member 5 moves from the inactive position toward the active position. Thus, it is possible to avoid a dead zone as the cushioning member 12 or the clutch spring 11 is compressed in the compression process of the release spring m and to further suppress a feeling of surprise when power is transmitted and to improve operability. Moreover, in a case where the cushioning member 12 is disposed, because the cushioning member 12 includes a spring that is set to a load such that the spring is compressed before the clutch spring 11 starts to be compressed, it is possible to more reliably suppress a feeling of surprise when power is transmitted.

Moreover, in a case where the cushioning member 12 is disposed, the cushioning member 12 is accommodated in the accommodation recessed portion 4c formed in a surface where the first clutch member 4a and the second clutch member 4b face each other. Therefore, it is possible to avoid positional displacement of the cushioning member 12 that may occur if the cushioning member 12 is involved when the first clutch member 4a moves relative to the second clutch member 4b. The accommodation recessed portion 4c is formed in a surface of the first clutch member 4a facing the second clutch member 4b. However, the accommodation recessed portion 4c may be formed in a surface of the second clutch member 4b facing the first clutch member 4a.

Furthermore, the accommodation recessed portion 4c described above includes an annular groove and the cushioning member 12 includes a spring with an annular shape conformed to the shape of the groove. Therefore, it is possible to apply an urging force substantially uniformly generated by the cushioning member 12 to the second clutch member 4b or the like, and it is possible to apply the urging force stably. The back-torque transmitting cam described above is formed in a plurality of annular shapes in a surface where the first clutch member 4a and the second clutch member 4b face each other. The accommodation recessed portion 4c is formed in a concentric circular shape at a position that is adjacent to the back-torque transmitting cam. Therefore, it is possible to enable the back-torque transmitting cam to reliably and stably move the second clutch member 4b and to enable the cushioning member 12 to reliably and stably apply an urging force.

In addition, the bearing holding member C, according to the present embodiment, includes a cylindrical member with one open end. The open end portion Ca is fit into and attached to the recessed portion 4d formed in the clutch member (the first clutch member 4a) (attached in a socket-and-spigot joint state). Therefore, it is easy to assemble the bearing holding member C, and it is possible to stably operate the bearing holding member C when a shifting operation is performed.

The power transmission device includes the release spring (m) that applies an urging force to the pressure member 5 while allowing movements of the interlocking member 9 and the pressure member 5 until the drive-side clutch plates 6 and the driven-side clutch plates 7 reach an engaged state before the drive-side clutch plates 6 and the driven-side clutch plates 7 are pressed against each other. The release spring (m) is attached to both the bearing holding member C and the pressure member 5. The release spring (m) applies an urging force to the pressure member 5, and an urging force to the bearing holding member C to transmit the urging force to the activation member 10. Therefore, it is possible to use the release spring (m) also as a spring to prevent play of a shift operation means, and to reduce the number of components.

Moreover, the release spring (m), according to the present embodiment, includes a coned-disc spring that generates an urging force due to a displacement between the middle part (ma) and the peripheral edge part (mb). The middle part (ma) is attached to the bearing holding member C and the peripheral edge part (mb) is attached to the pressure member 5. Therefore, it is possible to stably apply urging forces of the release spring (m) to the bearing holding member C and the pressure member 5.

Furthermore, the clutch member, according to the present embodiment, includes the first clutch member 4a, coupled to the output shaft 3 (output member), the second clutch member 4b, attached to the driven-side clutch plates 7, and a back-torque transmitting cam. The back-torque transmitting cam presses the drive-side clutch plates 6 and the driven-side clutch plates 7 against each other by moving the second clutch member 4b when a rotational force is input to the first clutch member 4a via the output shaft 3 (output member). The recessed portion 4d is formed in the first clutch member 4a. Therefore, it is possible to avoid the bearing holding member C from interfering with movement of the second clutch member 4b due to the back-torque transmitting cam. Thus, it is possible to enable the back-torque transmitting cam to smoothly move each of the bearing holding member C and the second clutch member 4b.

With the embodiment described above, the back-torque transmitting cam can move the second clutch member 4b in a direction toward the interlocking member 9 to maintain contact between the interlocking member 9 and the weight member 8. Therefore, it is possible to press the drive-side clutch plates 6 and the driven-side clutch plates 7 against each other to transmit a rotational force on the wheel side to the engine side to apply an engine brake. Thus, it is possible to stably perform activation by the weight member 8 when an engine brake is applied.

The back-torque transmitting cam, according to the present embodiment, includes the cam surfaces (K1, T1), respectively, integrally formed in the first clutch member 4a and the second clutch member 4b. The cam surfaces (K1, T1) are, respectively, formed in the mating surfaces of the first clutch member 4a and the second clutch member 4b. Therefore, it is possible to enable the back-torque transmitting cam to reliably and smoothly move the second clutch member 4b.

Moreover, the power transmission device includes a press-contact assisting cam including the inclined surface 4aa of the first clutch member 4a and the inclined surface 5a of the pressure member 5 facing each other. This increases the press-contact force between the drive-side clutch plates 6 and the driven-side clutch plates 7 when a rotational force input to the input gear 1 (input member) becomes capable of being transmitted to the output shaft 3 (output member). Therefore, it is possible to apply a press-contact force due to the press-contact assisting cam in addition to a press-contact force due to the movement of the weight member 8 by a centrifugal force. Thus, it is possible to press the drive-side clutch plates 6 and the driven-side clutch plates 7 against each other more smoothly and more reliably.

Furthermore, the power transmission device includes a back-torque limiter cam including the inclined surface 4ab of the first clutch member 4a and the inclined surface 5b of the pressure member 5 facing each other. The back-torque limiter cam releases the press-contact force between the drive-side clutch plates 6 and the driven-side clutch plates 7 when the rotational speed of the output shaft 3 (output member) exceeds the rotational speed of the input gear 1 (input member) and the clutch member (the first clutch member 4a) and the pressure member 5 rotate relative to each other. Therefore, it is possible to avoid excessive driving power from being transmitted to the engine side via the input gear 1 when the weight member 8 is at the radially-outer position. Thus, it is possible to reliably activate the back-torque transmitting cam since the back-torque transmitting cam is activated before the back-torque limiter cam starts working.

In addition, the present embodiment includes a back-torque transmitting cam that moves the second clutch member 4b to press the drive-side clutch plates 6 and the driven-side clutch plates 7 against each other when a rotational force is input to the first clutch member 4a, via the output shaft 3 (output member). A torque transmitting portion is formed in each of the first clutch member 4a and the second clutch member 4b that can transmit a rotational force, that has been transmitted to the second clutch member 4b, to the first clutch member 4a without using the back-torque transmitting cam (the cam surface K1 and the cam surface T1). Therefore, it is possible to apply an engine brake by pressing the drive-side clutch plates 6 and the driven-side clutch plates 7 against each other to transmit a rotational force on the wheel side to the engine side. Thus, it is possible to stably perform power transmission when the weight member 8 moves to the radially-outer position and the pressure member 5 moves to the active position.

Further, the power transmission device includes the movement-amount limiting portion, formed in each of the first clutch member 4a and the second clutch member 4b, that limits the movement amount of the second clutch member 4b due to the back-torque transmitting cam. Therefore, it is possible to enable the back-torque transmitting cam to move the second clutch member 4b in a set range.

Moreover, the protruding portion F is formed in either one of the first clutch member 4a and the second clutch member 4b. The torque transmitting portion includes one side surface F1 of protruding portion F and the first contact surface G1 that receives a rotational force by contacting the one side surface F1. The movement-amount limiting portion includes the other side surface F2 of the protruding portion F and the second contact surface G2 that limits the movement amount by contacting the other side surface F2. Therefore, the protruding portion F can function as both the torque transmitting portion and the movement-amount limiting portion.

Heretofore, the present embodiment has been described. However, the present disclosure is not limited to these. For example, as illustrated in FIGS. 25 and 26, the present disclosure may be applied to a power transmission device where a weight member 8 is disposed movably in a housing portion 2a of a clutch housing 2. The power transmission device includes, as with the embodiment described above, a first clutch member 4a, a second clutch member 4b, a back-torque transmitting cam, and a cushioning member 12 interposed between the first clutch member 4a and the second clutch member 4b.

FIG. 25 illustrates an embodiment where a cushioning member 12 is attached to a surface of the first clutch member 4a facing the second clutch member 4b. FIG. 26 illustrates an embodiment where a cushioning member 12 applies an urging force to a part (disc pack) of the first clutch member 4a where the drive-side clutch plates 6 and the driven-side clutch plates 7 are stacked is attached to the surface. A bearing holding member C' can be moved by an activation member 10'. A release spring m' is composed of a coil spring that is attached to both the bearing holding member C' and the pressure member 5.

Moreover, instead of the cushioning member 12 including a coned-disc spring, another elastic member may be used. For example, as illustrated in FIG. 27, a cushioning member 12' composed of a wave spring may be disposed in an accommodation recessed portion 4c. As illustrated in FIGS. 28 and 29, the wave spring includes a C-shaped member with a cutout portion 12'a in a part of an annular shape, has a wave shape with respect to the thickness direction t, and can generate an elastic force. The wave spring is interposed between the first clutch member 4a and the second clutch member 4b. The wave spring, being compressed, applies an urging force while allowing movements of the interlocking member 9 and the pressure member 5 in the process where the interlocking member 9 moves and the pressure member 5 moves from the inactive position toward the active position.

In the power transmission device illustrated in the figure, the bearing holding member C has a plurality of (in the present embodiment, three) communication holes Cc formed in a side wall. This allows oil supplied to the inside of the bearing holding member C to flow to the outside via an oil flow path r. An activation member 10" is engaged with a roller bearing B1 of the bearing holding member C. It can move the pressure member 5 between the active position and the inactive position by moving in the left-right direction, in the figure due, to an operation by a driver or by working of an actuator.

As illustrated in FIG. 27, the activation member 10" according to the present embodiment is of a pull-type. When operated by hand or an actuator, the activation member 10" moves rightward in the figure and pulls the bearing B1 in the same direction. Thus, the activation member 10" can release the press-contact force between the drive-side clutch plates 6 and the driven-side clutch plates 7. As illustrated in FIG. 30, a cushioning member 12', including a coned-disc spring, may be used instead of the cushioning member 12 of the power transmission device illustrated in FIG. 27.

Furthermore, as illustrated in FIG. 31, a back-torque transmitting cam (a cam surface K1 and a cam surface T1) may be disposed in an outer peripheral edge part of each of a first clutch member 4a and a second clutch member 4b. With the power transmission device, because the back-torque transmitting cam is disposed in the outer peripheral edge part of each of the first clutch member 4a and the second clutch member 4b, the function of the cam can be enhanced, and the moving force (thrust force) of the second clutch member 4b can be set to be large.

In the power transmission device illustrated in FIG. 31, a cushioning member 12 or 12' is not disposed. However, a cushioning member 12, including a coned-disc spring, may be disposed on the radially-inner side of the back-torque transmitting cam (a cam surface K1 and a cam surface T1) (see FIG. 32), or a cushioning member 12' including a wave spring may be disposed on the radially-inner side of the back-torque transmitting cam (a cam surface K1 and a cam surface T1) (see FIG. 33).

In the present embodiment, the bearing holding member C includes a cylindrical member with one open end. The open end portion Ca is fit into and attached to the recessed portion 4d formed in the clutch member (the first clutch member 4a). However, a bearing holding member with another shape may be used, and an attachment structure that differs from a configuration (so-called socket-and-spigot joint) such that the bearing holding member is fit into a recessed portion formed in the clutch member may be used. Note that the power transmission device, according to the present disclosure, can be applied to various multiple-disc clutch power transmission devices for, in addition to a motorcycle, an automobile, a three-wheeled or four-wheeled ATV, a general-purpose machine, and the like.

The present disclosure can be applied to a power transmission device with a different outer shape or having another additional function as long as the set load of the clutch spring is set to be smaller than the maximum load of the release spring.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A power transmission device comprising:
    a clutch housing rotating together with an input member rotated by engine driving power of a vehicle and including a plurality of drive-side clutch plates;
    a clutch member includes a plurality of driven-side clutch plates that are alternately formed with the drive-side clutch plates of the clutch housing, the clutch member coupled with an output member rotating a wheel of the vehicle;
    a pressure member movable between an active position and an inactive position, in the active position, the pressure member presses the drive-side clutch plates and the driven-side clutch plates against each other to transmit the engine driving power to the wheel and in the inactive position, the pressure member releases a press-contact force between the drive-side clutch plates and the driven-side clutch plates to stop transmitting the engine driving power to the wheel;
    a weight member disposed in a groove portion extending in a radial direction of the clutch housing, the weight member movable from a radially-inner position to a radially-outer position in the groove portion due to a centrifugal force generated by rotation of the clutch housing;
    an interlocking member moving the pressure member from the inactive position to the active position as the weight member moves from the radially-inner position to the radially-outer position;
    a release spring holding the pressure member at the inactive position, the release spring is compressed as the interlocking member moves and the pressure member moves from the inactive position toward the active position, the release spring applying an urging force, while allowing movements of the interlocking member and the pressure member, until the drive-side clutch plates and the driven-side clutch plates reach an engaged state before the drive-side clutch plates and the driven-side clutch plates are pressed against each other; and a clutch spring is compressed in the course of the interlocking member moving after the drive-side clutch plates and driven-side clutch plates have reached the engaged state and the clutch spring applying a press-contact force between the drive-side clutch plates and the driven-side clutch plates while allowing movement of the interlocking member;

a set load of the clutch spring is set to be smaller than a maximum load of the release spring.

2. The power transmission device according to claim 1, further comprising a cushioning member, being compressed, applying an urging force while allowing movements of the interlocking member and the pressure member in the course of the interlocking member moving and the pressure member moves from the inactive position toward the active position.

3. The power transmission device according to claim 2, wherein the cushioning member includes a spring that is set to a load such that the spring is compressed before the clutch spring starts to be compressed.

\* \* \* \* \*